(12) United States Patent
Kinoshita et al.

(10) Patent No.: US 7,797,416 B2
(45) Date of Patent: Sep. 14, 2010

(54) COMPUTER SYSTEM, MANAGEMENT SERVER, AND MISMATCHED CONNECTION CONFIGURATION DETECTION METHOD

(75) Inventors: Naohide Kinoshita, Yokohama (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/145,532

(22) Filed: Jun. 25, 2008

(65) Prior Publication Data

US 2009/0187675 A1 Jul. 23, 2009

(30) Foreign Application Priority Data

Jan. 23, 2008 (JP) ............................. 2008-012285

(51) Int. Cl.
*G06F 15/173* (2006.01)
(52) U.S. Cl. ........................... 709/223; 709/220; 710/8; 715/735
(58) Field of Classification Search ......... 709/220–223; 710/8, 10; 715/735–740
See application file for complete search history.

(56) References Cited

U.S. PATENT DOCUMENTS

| | | | | |
|---|---|---|---|---|
| 5,265,241 A | * | 11/1993 | Arnold et al. | 710/15 |
| 5,590,287 A | * | 12/1996 | Zeller et al. | 710/307 |
| 6,345,317 B1 | * | 2/2002 | Takeda | 710/2 |
| 6,832,271 B1 | * | 12/2004 | Ivan et al. | 710/15 |
| 2005/0149644 A1 | * | 7/2005 | Beeston et al. | 710/15 |
| 2006/0036733 A1 | * | 2/2006 | Fujimoto et al. | 709/225 |
| 2008/0189441 A1 | * | 8/2008 | Jundt et al. | 710/3 |

FOREIGN PATENT DOCUMENTS

JP 2005-301488 10/2005

\* cited by examiner

*Primary Examiner*—Salad Abdullahi
(74) *Attorney, Agent, or Firm*—Brundidge & Stanger, P.C.

(57) ABSTRACT

The management of computers connected with I/O switch devices is simplified. A computer system S includes one or several computers (server devices), one or several I/O devices, one or several I/O switch devices, and a management server 101. Management server 101 is provided with a storage part storing I/O configuration information and I/O switch management information; and a processing part comparing pieces of I/O configuration information and pieces of I/O switch management information, judging whether there might be a mismatch in the connection configuration between a computer and an I/O device and, in case it is judged that there is a mismatch, terminating the activation for a computer having the mismatched connection configuration, allocating a substitutable I/O device, and updating said I/O switch management information.

20 Claims, 22 Drawing Sheets

FIG.10

109 I/O SWITCH MANAGEMENT TABLE

| I/O SWITCH IDENTIFIER (1001) | PORT NUMBER (1002) | CONNECTING DEVICE (1003) | DEVICE IDENTIFIER (1004) | STATE (1005) |
|---|---|---|---|---|
| SW1 | 0 | NIC | MAC1 | NORMAL |
| SW1 | 1 | HBA | WWN1 | NORMAL |
| SW1 | 2 | NIC | MAC2 | NORMAL |
| SW1 | 3 | HBA | WWN2 | NORMAL |
| SW1 | 4 | HOST | HOST1 | NORMAL |
| SW1 | 5 | HOST | HOST2 | NORMAL |
| SW1 | 6 | HOST | HOST3 | NORMAL |
| SW1 | 7 | HOST | HOST4 | NORMAL |
| SW2 | 0 | NIC | MAC3 | NORMAL |
| SW2 | 1 | HBA | WWN3 | NORMAL |
| SW2 | 2 | NIC | MAC4 | NORMAL |
| SW2 | 3 | HBA | WWN4 | NORMAL |
| SW2 | 4 | HOST | HOST5 | NORMAL |
| SW2 | 5 | HOST | HOST6 | NORMAL |
| SW2 | 6 | HOST | HOST7 | NORMAL |
| SW2 | 7 | HOST | HOST8 | NORMAL |

FIG.11

110 SERVER MANAGEMENT TABLE

| SERVER DEVICE IDENTIFIER | PROCESSOR CONFIGURATION | MEMORY CAPACITY | SERVER CONNECTION I/O PORT | SERVER ALLOCATION I/O PORT | SERVER ALLOCATION DEVICE | ALLOCATION DISK |
|---|---|---|---|---|---|---|
| 1101 | 1102 | 1103 | 1104 | 1105 | 1106 | 1107 |
| HOST1 | PROCESSOR 1 2GHz×2 | 4GB | SW1 PORT 3 | PORT 0 | NIC | — |
| | | | | PORT 1 | HBA | LU0 |
| | | | SW2 PORT 3 | PORT 0 | NIC | — |
| | | | | PORT 1 | HBA | LU1 |
| HOST2 | PROCESSOR 1 1GHz | 2GB | SW1 PORT 4 | PORT 2 | NIC | — |
| | | | | PORT 3 | HBA | LU2 |
| HOST3 | PROCESSOR 1 1GHz | 2GB | SW2 PORT 4 | PORT 2 | NIC | — |
| | | | | PORT 3 | HBA | LU3 |
| HOST4 | PROCESSOR 1 2GHz×2 | 4GB | NOT YET ALLOCATED | NOT YET ALLOCATED | — | — |

FIG.12

111 SERVER I/O CONFIGURATION INFORMATION TABLE

| DEFI-NITION | I/O SWITCH IDENTIFIER (1202) | PORT NUMBER (1203) | CONNECTING DEVICE (1204) | CONNECTION DESTINATION DEVICE (1205) | ALLOCATED LOGICAL PARTITION (1206) | ACTIVATION OS (1207) | LOGICAL LOCATION CODE (1208) | DEGREE OF IMPORTANCE (1209) |
|---|---|---|---|---|---|---|---|---|
| 1 | SW1 | 0 | HBA | SAN1 | LPAR1 | OS1 | AB-CD | LEVEL 3 |
| 1 | SW1 | 2 | HBA | SAN2 | LPAR1 | OS1 | AB-EW | LEVEL 3 |
| 1 | SW1 | 7 | HBA | SAN3 | LPAR1 | OS1 | WE-RE | LEVEL 2 |
| 1 | SW2 | 3 | NIC | G/W1 | LPAR1 | OS1 | GT-10 | LEVEL 2 |
| 2 | SW1 | 0 | HBA | SAN1 | LPAR2 | OS2 | 01-00 | LEVEL 3 |
| 2 | SW1 | 2 | HBA | SAN2 | LPAR2 | OS2 | 01-03 | LEVEL 3 |
| 2 | SW1 | 8 | NIC | G/W2 | LPAR2 | OS2 | 0A-00 | LEVEL 2 |
| 2 | SW2 | 3 | NIC | G/W1 | LPAR2 | OS2 | 01-07 | LEVEL 2 |
| 3 | SW1 | 0 | HBA | SAN1 | LPAR3 | OS1 | SN-00 | LEVEL 3 |
| 3 | SW1 | 2 | HBA | SAN2 | LPAR3 | OS1 | SN-11 | LEVEL 3 |
| 3 | SW2 | 3 | NIC | G/W1 | LPAR3 | OS1 | GT-10 | LEVEL 3 |
| 3 | SW2 | 7 | SCSI | DVD-ROM | LPAR3 | OS1 | CD-10 | LEVEL 2 |
| 3 | SW1 | 4 | HBA | SAN4 | LPAR4 | OS2 | SN-00 | LEVEL 3 |
| 3 | SW1 | 5 | HBA | SAN4 | LPAR4 | OS2 | SN-11 | LEVEL 3 |
| 3 | SW2 | 3 | NIC | G/W1 | LPAR4 | OS2 | GT-10 | LEVEL 2 |
| 3 | SW2 | 4 | NIC | G/W2 | LPAR4 | OS2 | GT-11 | LEVEL 2 |
| 3 | SW3 | 0 | HBA | SAN5 | LPAR5 | OS3 | 1f-fp-1 | LEVEL 3 |
| 3 | SW3 | 1 | HBA | SAN6 | LPAR5 | OS3 | 1f-fp-2 | LEVEL 3 |
| 3 | SW3 | 3 | NIC | G/W1 | LPAR5 | OS3 | 1S-01 | LEVEL 2 |
| 3 | SW3 | 7 | HBA | SAN7 | LPAR5 | OS3 | 2f-fp-1 | LEVEL 0 |

1210
DEGREE OF IMPORTANCE : EXPRESSES THE LEVEL OF ABNORMAL CONFIGURATION
LEVEL 3 : PORT NUMBERS, CONNECTING DEVICES, CONNECTION DESTINATION DEVICES ALL MATCH
LEVEL 2 : PORT NUMBERS AND CONNECTING DEVICES MATCH
LEVEL 1 : PORT NUMBERS MATCH
LEVEL 0 : NO RESTRICTION

FIG.13

112 DEVICE POOL MANAGEMENT TABLE

| I/O SWITCH IDENTIFIER | PORT NUMBER | STATE | DEVICE POOL ALLOCATION |
|---|---|---|---|
| SW1 | 0 | ALLOCATION COMPLETED | — |
| | 1 | ALLOCATION COMPLETED | — |
| | 2 | ALLOCATION COMPLETED | — |
| | 3 | ALLOCATION COMPLETED | — |
| | 4 | ALLOCATION COMPLETED | — |
| | 5 | ALLOCATION COMPLETED | — |
| | 6 | NOT YET ALLOCATED | DEVICE POOL 1 |
| | 7 | NOT YET ALLOCATED | |
| SW2 | 0 | ALLOCATION COMPLETED | — |
| | 1 | ALLOCATION COMPLETED | — |
| | 2 | ALLOCATION COMPLETED | — |
| | 3 | ALLOCATION COMPLETED | — |
| | 4 | ALLOCATION COMPLETED | — |
| | 5 | ALLOCATION COMPLETED | — |
| | 6 | NOT YET ALLOCATED | DEVICE POOL 2 |
| | 7 | NOT YET ALLOCATED | |

406 PORT MANAGEMENT TABLE

| PHYSICAL PORT NUMBER (1401) | ALLOCATION GROUP (1402) | LOGICAL PORT NUMBER (1403) |
|---|---|---|
| 0 | 0 | 0 |
| 1 | 0 | 1 |
| 2 | 1 | 0 |
| 3 | — | — |
| 4 | 0 | 2 |
| 5 | 1 | 1 |
| 6 | — | — |
| 7 | — | — |

FIG.22

2201 I/O CONFIGURATION DEFINITION EDIT SCREEN OF SERVER DEVICE

I/O Profile : CPU Blade1

Profile Name : DB Server

EDIT (E) ADD (A) DELETE (D) ···

| | I/O SW | port | TYPE | CONNECTION DESTINATION | DEGREE OF IMPORTANCE |
|---|---|---|---|---|---|
| ☐ | SW1 | 1 | HBA1 | SAN1 | LEVEL 3 |
| ☐ | SW1 | 2 | HBA2 | SAN2 | LEVEL 3 |
| ☐ | SW1 | 16 | NIC1 | G/W1 | LEVEL 2 |
| ☐ | SW2 | 4 | NIC2 | G/W2 | LEVEL 2 |

FIG.23

2301 ACTIVATION ERROR NOTIFICATION SCREEN

ACTIVATION ERROR

I/O CONFIGURATION OF I/O SWITCH 1 - SLOT 2 IS ABNORMAL. PLEASE CHECK THE ADAPTER TYPE AND CONNECTION DESTINATION DEVICE.

- ABNORMAL SLOT NUMBER : 2
- CONTENTS NOT MATCHING PROFILE :

| PROFILE CONFIGURATION | CURRENT CONFIGURATION |
|---|---|
| HBA1−SAN1 | NIC2−G/W2 |

○ TERMINATE ACTIVATION AND REVISE I/O CONFIGURATION
◉ IMPLEMENT REPAIR

FIG.24

2401 I/O REPAIR SCREEN

I/O REPAIR: CPU BLADE 1

PLEASE SELECT A SUBSTITUTABLE PORT AND CLICK ON "REPAIR"

ABNORMAL I/O PORT

|   | I/O SW | port | DEVICE | CONNECTION DESTINATION |
|---|---|---|---|---|
| ☑ | SW1 | 2 | NIC2 | G/W2 |

SUBSTITUTABLE PORTS

|   | I/O DRAWER | port | DEVICE | CONNECTION DESTINATION |
|---|---|---|---|---|
| ☑ | SW1 | 10 | HBA2 | SAN2 |
| ☐ | SW2 | 4 | HBA2 | SAN2 |
| ☐ | SW3 | 15 | HBA2 | SAN2 |
| ⋮ | ⋮ | ⋮ | ⋮ | |

[ REPAIR ]  [ CANCEL ]

COMPUTER SYSTEM, MANAGEMENT SERVER, AND MISMATCHED CONNECTION CONFIGURATION DETECTION METHOD

BACKGROUND OF THE INVENTION

1. Field of the Invention

The present invention pertains to technology simplifying the management of computers connected with I/O (Input/Output) switch devices.

2. Description of the Related Art

Generally, it often occurs that a server device is connected with a plurality of external devices of different types. As examples of external devices, there are network devices and storage devices. These external devices have differing required functions, performance, reliability, cost, and the like. As a result, the protocols for connecting the server device and an external device differ for each external device. Consequently, in order to e.g. connect a server device and a plurality of external devices, there are respectively provided I/O devices processing different protocols between the server device and each external device.

Regarding common server devices in recent years, the associations between server devices and the I/O devices have been fixed, modifications not being possible. As a result, in an environment where a number of server devices are operating such as in corporate computer systems and data centers, there is a need to select the required I/O device for each server device. However, if the associations between server devices and I/O devices are fixed, in case a change in the use, or the like, of a server device arises, there is a need to carry out mounting and demounting of I/O devices, so there is the problem that operational management is made complicated.

As one technology solving this problem, there is the I/O switch (device). An I/O switch is a device located between the server device and the aforementioned I/O devices and by controlling the configuration of the I/O switch, it becomes possible to flexibly modify the I/O devices allocated to the server device. In addition, since an I/O switch can also connect a plurality of server devices, it can make the allocation of I/O devices with respect to a plurality of server devices flexible and can relax the complexity of operational management (refer e.g. to JP-A-2005-301488).

SUMMARY OF THE INVENTION

However, if an I/O switch is used, the reverse face of making the allocation of the aforementioned I/O devices flexible is that there arises the problem of making the I/O configuration complex. E.g., if first, as a comparison therewith, an explanation is given regarding the case of a server device not using an I/O switch, it is possible to manage easily, since only one server device is influenced even if an exchange (additional installation) of an I/O adapter (I/O device) is implemented. In other words, even if one ends up making an abnormal (in the sense of "not normal", and similarly in the following) I/O configuration modification, it is possible for the administrator to swiftly solve the problem by verifying the physical location.

Moreover, in the case of a server device using an I/O switch, the server device and the I/O device are separated and, as well, a plurality of server devices are connected with the I/O switch. Because of this, the management of the I/O configuration becomes complex. E.g., since the system is devised to flexibly allocate a plurality of I/O devices connected with the I/O switch with respect to a plurality of server devices, there easily arises the problem that the I/O configuration intended by the server device is not activated, due to operations of allocation conflict and abnormal configuration modifications.

Because of this, there is a need for the administrator to implement a flexible device allocation, together with accurately grasping the I/O configuration for each server. Also, based on a balance between the extent of demerit due to an activation with an abnormal I/O configuration and the extent of merit due to an activation even if what is concerned is an abnormal I/O configuration, there are cases where the state, type, and connection destination device of the I/O adapter (I/O device) needs to be matched for each I/O port, and there are cases where all of the same need not necessarily be matched. And then, in the prior art of the aforementioned JP-A-2005-301488, it is not possible to make such a flexible correspondence, making the management of a server device (computer) connected with an I/O switch device complicated.

Accordingly, the present invention is constituted to solve the aforementioned problem and regards as a problem requiring solution the simple management of computers connected with an I/O switch device.

In order to solve the aforementioned problem, the present invention is a computer system which is provided with one or several computers, one or several I/O devices, one or several I/O switch devices, and a management server. The management server is provided with: a storage part storing I/O configuration information and I/O switch management information; and a processing part comparing the I/O configuration information and the I/O switch management information, judging whether there might by any abnormality in the configuration of the connection between the computer(s) and the I/O device(s), and, in case it is judged that there is some abnormality, terminating activation relative to the computer (s) having the abnormal connection configuration, allocating a substitutable I/O device, and updating the I/O switch management information. Regarding other measures, a description will be given subsequently.

According to the present invention, it is possible to simplify the management of computers connected with I/O switch devices.

BRIEF DESCRIPTION OF THE DRAWINGS

FIG. 10 is a diagram showing an I/O switch management table.

FIG. 11 is a diagram showing a server management table.

FIG. 12 is a diagram showing a server I/O configuration information table.

FIG. 13 is a diagram showing a device pool management table.

FIG. 14 is a diagram showing a port management table.

FIG. 22 is a diagram showing a GUI of an I/O configuration definition edit screen.

FIG. 23 is a diagram showing a GUI at the time of an activation error notification.

FIG. 24 is a diagram showing a GUI of an I/O repair screen.

DESCRIPTION OF THE EMBODIMENT

Hereinafter, an explanation will be given, with reference to the drawings, regarding the best mode (below called the embodiment) of implementing the invention. (Reference may also appropriately be made to drawings other than those mentioned). First, with reference to FIG. 1, an explanation is given regarding each device constituting the computer system of the present embodiment and thereafter, with reference to FIG. 2 to FIG. 6, an explanation is given regarding the hardware configuration, and the like, of each device.

Figure 1:
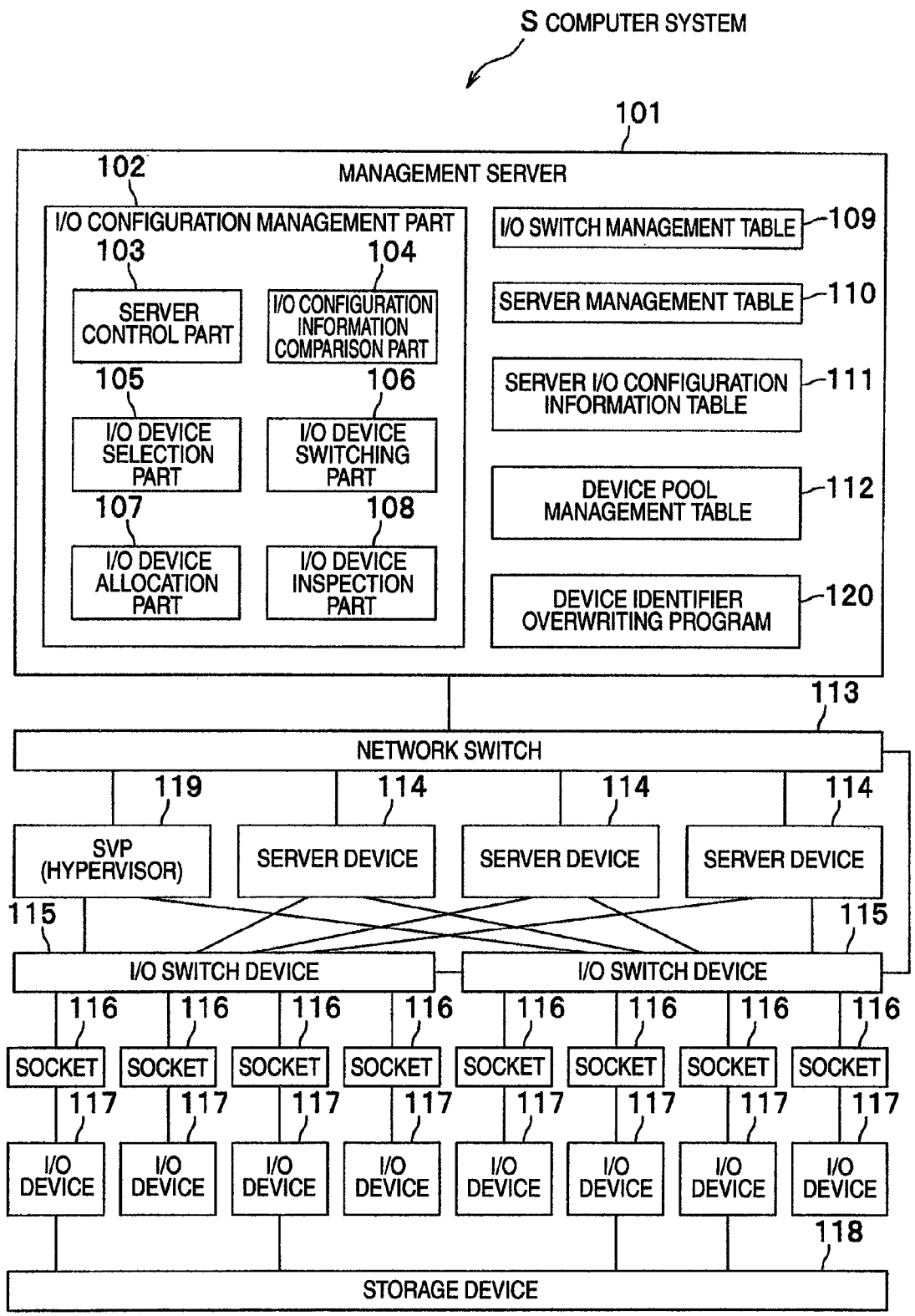
FIG. 1 is an overall diagram of the present embodiment.

FIG. 1 is a general view showing a computer system of the present embodiment. A management server 101 has the principal function of control in a computer system S. Management server 101 comprises an I/O configuration management part (processing part) 102, an I/O switch management table 109, a server management table 110, a server I/O configuration information table 111, a device pool management table 112, and a device identifier overwriting program 120. I/O configuration management part 102 comprises a server control part 103, an I/O configuration information comparison part 104, and I/O device selection part 105, an I/O device switching part 106, an I/O device allocation part 107, and an I/O device inspection part 108.

Management server 101 is connected, via a network switch 113, with server devices (computers) 114 as well as a firmware layer SVP (Service Processor) 119. Server devices 114 and SVP 119 are connected with I/O switch devices 115. I/O switch devices 115 are connected, via sockets 116, with I/O devices 117 (hereinafter, the mention "via sockets 116" will be omitted).

Further, among I/O devices 117, a few are connected with a storage device (external device) 118 and as a result hereof, it is possible to make access from server devices 114 to storage device 118. Management server 101 has the functions of detecting and recovering from errors (abnormal connection configurations) in server devices 114, I/O switch devices 115, and I/O devices 117.

Server control part 103 has the functions of obtaining the issuance of various commands such as activations and halts passing through SVP 119 with respect to server devices 114 and information from I/O switch devices 115.

I/O configuration information comparison part 104 has the function of comparing the current configuration of I/O devices 117 and information in server I/O configuration information table 111 (I/O configuration information) held by management server 101.

I/O device selection part 105 has the function of extracting and selecting, in case it is judged that the I/O device 117 whose allocation to a server device 114 is attempted is abnormal, a substitute I/O device 117.

I/O device switching part 106 has the function of registering, in server I/O configuration information table 111, the configuration in which the selected I/O device 117 judged to be abnormal has been exchanged with a substitute I/O device 117.

I/O device allocation part 107 has the function of allocating an I/O device 117 to server device 114, in accordance with the contents registered in server I/O configuration information table 111.

I/O device inspection part 108 has the function of acquiring the information about I/O device 117, at the time of the activation of server device 114 or at the time of an I/O configuration modification, the information about I/O devices 117 connected with I/O switch device 115 and a storage device 118 or the like, connected with the same I/O device 117.

In I/O switch management table 109 (I/O switch management information), there is stored information (mentioned subsequently in FIG. 10) about I/O devices 117 connected with I/O switch devices 115.

In server management table 110, there is stored defining information, the state, and so forth (subsequently mentioned in FIG. 11), of the I/O configuration of server device 114.

In server I/O configuration information table 111, there is defined (subsequent mention in FIG. 12) one or a plurality of I/O switch devices 115 connected with a server device 114, the I/O devices 117 connected subsequently thereto, and connection destination devices, connected further subsequently thereto (such as storage device 118), as well as the degree of importance (details will be mentioned subsequently), and the like.

In device pool management table 112, there are defined, for the case where an I/O device 117 is judged to be abnormal, substitute I/O devices 117 therefor (subsequently mentioned in FIG. 13).

As for device identifier overwriting program 120, there is stored a program having the function of overwriting individual identifiers that I/O devices 117 have.

Further, in the present embodiment, there is shown an embodiment in which management server 101, in case an I/O device 117 connected with a server device 114 has been modified abnormally, temporarily halts the activation of server device 114, selects a substitutable I/O device 117, and makes the activation in a normal state.

Figure 2:
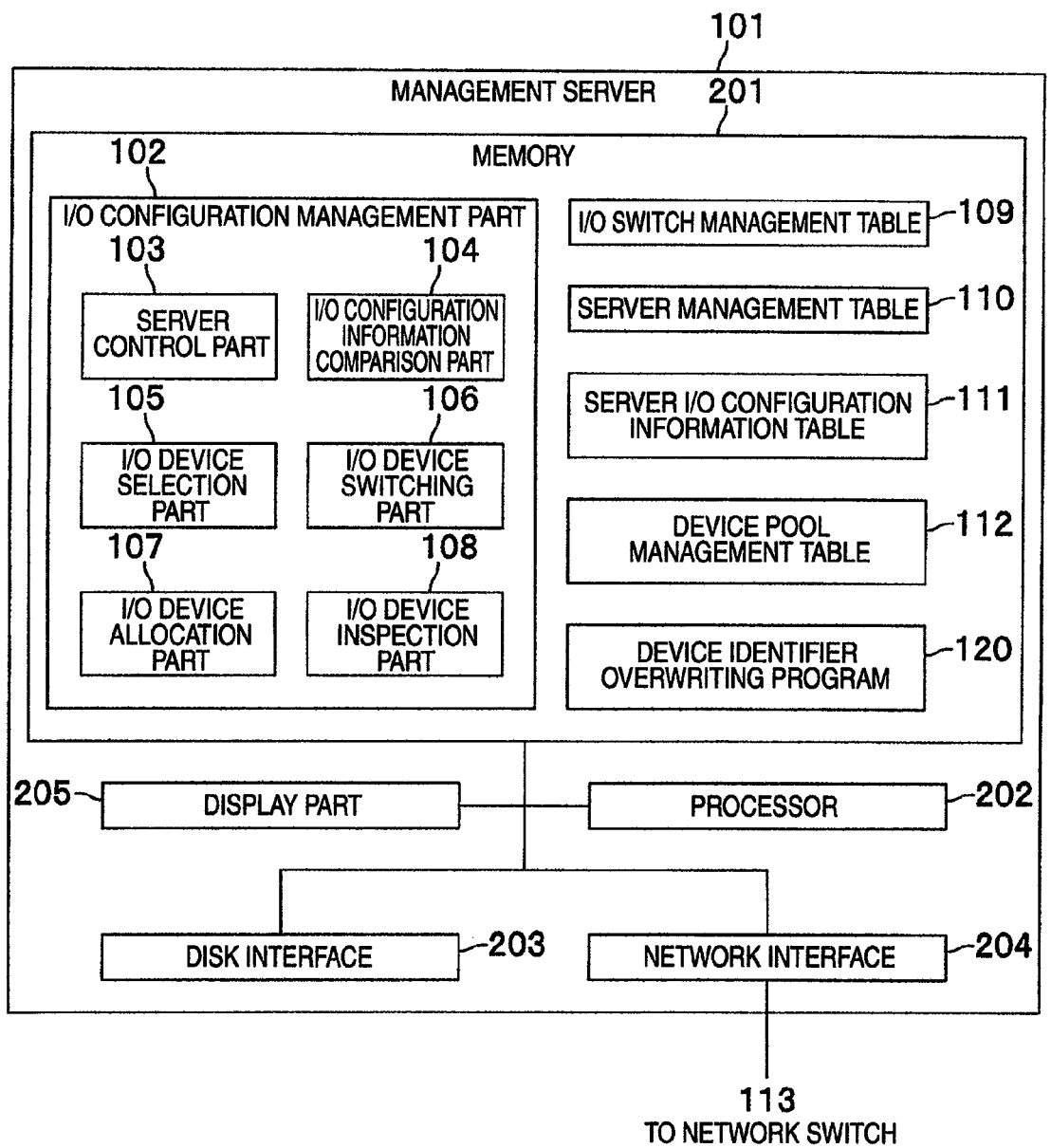
FIG. 2 is a diagram showing the configuration of a management server.

FIG. 2 is a diagram showing the configuration of management server 101. Management server 101 comprises a memory (storage part) 201, a processor (processing part) 202, a disk interface 203, a network interface 204, and a display part 205. Within memory 201, there are stored an I/O switch management table 109, a server management table 110, a server I/O configuration information table 111, a device pool management table 112, and a device identifier overwriting program 120. In I/O configuration management part 102, there are included a server control part 103, an I/O configuration information comparison part 104, an I/O device selection part 105, an I/O device switching part 106, an I/O device allocation part 107, and an I/O device inspection part 108.

I/O configuration management part 102, I/O switch management table 109, server management table 110, server I/O configuration information table 111, device pool management table 112, as well as device identifier overwriting program 120, all within memory 201, are read into processor 202 and processed. Disk interface 203 is connected with a (not illustrated) disk in which a program for activating management server 101 is stored. Network interface 204 receives error information and the like of each device connected with network switch 113. Further, these functions may be implemented either in software or in hardware. Display part 205 is e.g. a liquid crystal display and carries out display according to instructions of processor 202.

Figure 3:
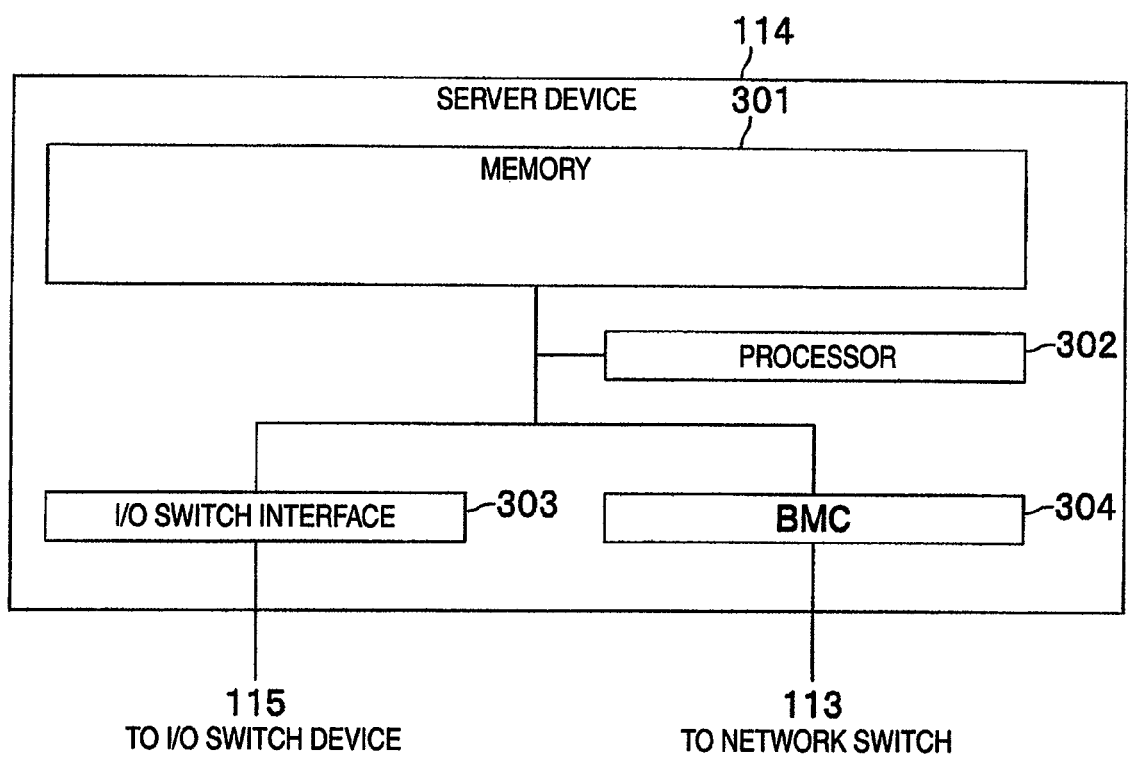
FIG. 3 is a diagram showing the configuration of a server device.

FIG. 3 is a diagram showing the configuration of server device 114. Server device 114 comprises a memory 301, a processor 302, an I/O switch interface 303, and a BMC (Baseboard Management Controller) 304. In memory 301, there are stored programs processed in server device 114, the same being executed by processor 302. I/O switch interface 303 is connected with I/O switch device 115.

BMC 304 has the function of notifying management server 101 of the error via network switch 113 in case an error occurs in the hardware inside server device 114. Further, since BMC 304 can operate independently of the place of occurrence of the error, it can transfer the error notification, even if an error has occurred in memory 301 or processor 302.

Figure 4:
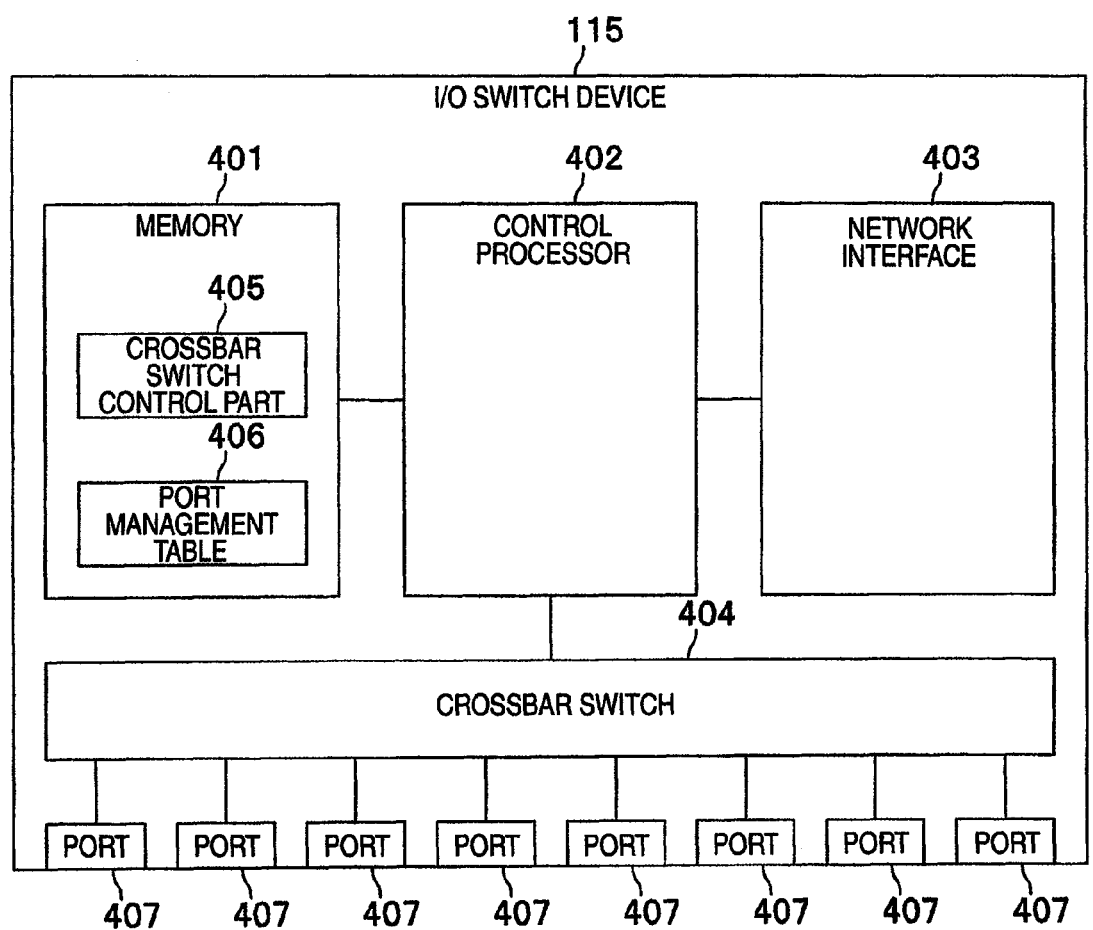
FIG. 4 is a diagram showing the configuration of an I/O switch device.

FIG. 4 is a diagram showing the configuration of I/O switch device 115. I/O switch device 115 comprises a memory 401, a control processor 402, a network interface 403, a crossbar switch 404, and ports 407. In memory 401, there are stored a crossbar switch control part 405 and a port management table 406 (mentioned subsequently in FIG. 14). Crossbar switch control part 405 has the function of controlling the state and allocation for each port 407.

Crossbar switch control part 405 and port management table 406 within memory 401 are read into control processor 402 and executed. I/O switch device 115 can carry out operations like transferring error information about other I/O switch devices 115 via network interface 403 and receiving commands for performing the control of I/O switch device 115. Port management table 406 stores state and allocation information for each port 407. Crossbar switch 404 is a communication path selection mechanism and carries out transfer control of data between ports 407.

Figure 5:
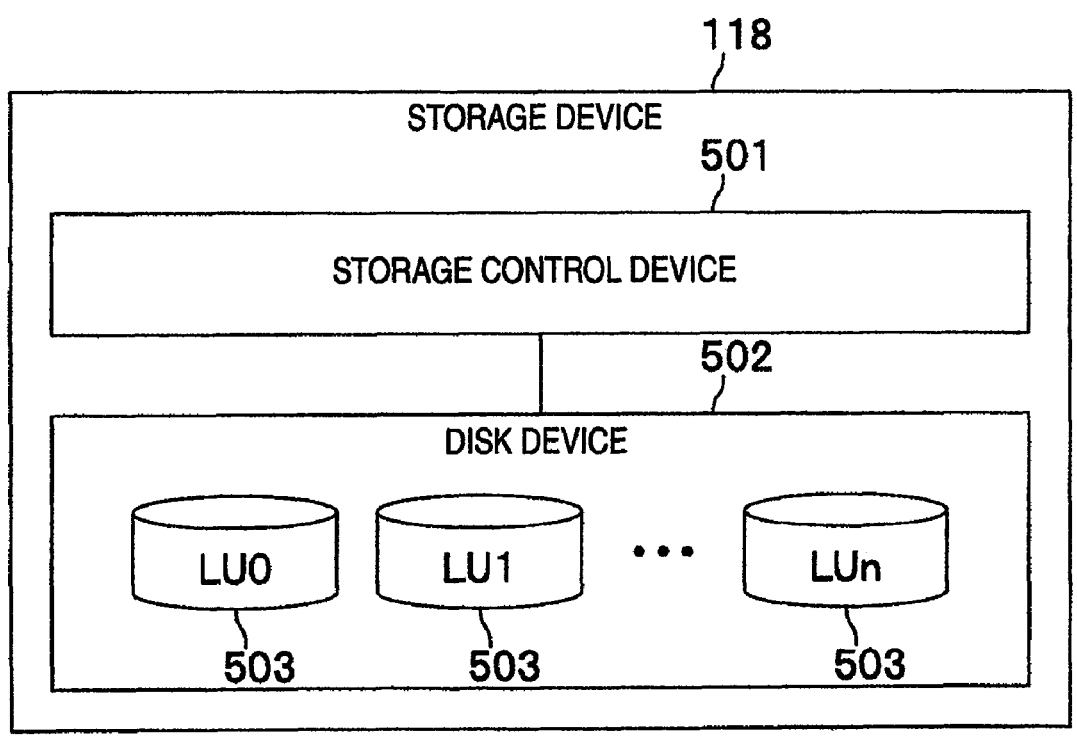
FIG. 5 is a diagram showing the configuration of a storage device.

FIG. 5 is a diagram showing the configuration of storage device 118. Server device 118 comprises a storage control device 501 and a disk device 502. Storage control device 501 is connected with server device 114 and carries out read/write operations with respect to a disk 503 inside disk device 502. In disk 503 inside disk device 502, there are respectively attached identifiers called logical units (LU) which are devised to be able to make a distinction between server devices 114.

Figure 6:
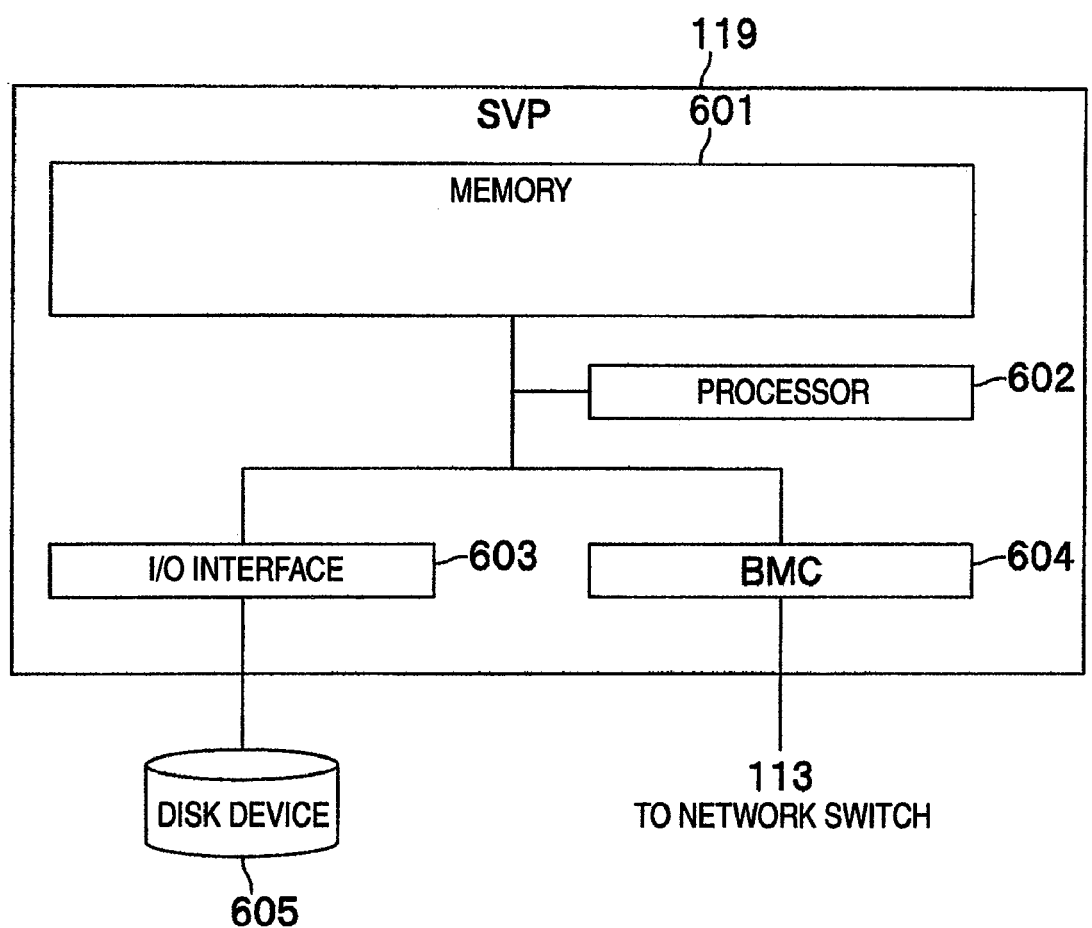
FIG. 6 is a diagram showing the configuration of a SVP.

FIG. 6 is a diagram showing the configuration of SVP 119. SVP 119 comprises a memory 601, a processor 602, an I/O interface 603, and a BMC 604. In memory 601, there are stored the programs processed with SVP 119, the same being executed by processor 602. I/O interface 603 is connected with a disk device 605 prepared exclusively for the SVP. The storage destination of the programs processed with the SVP programs is disk device 605. SVP 119 has the functions of making a connection with network switch 113 via BMC 604, carrying out communication with management server 101, server devices 114, and I/O switch devices 115, and controlling information.

Figure 7:
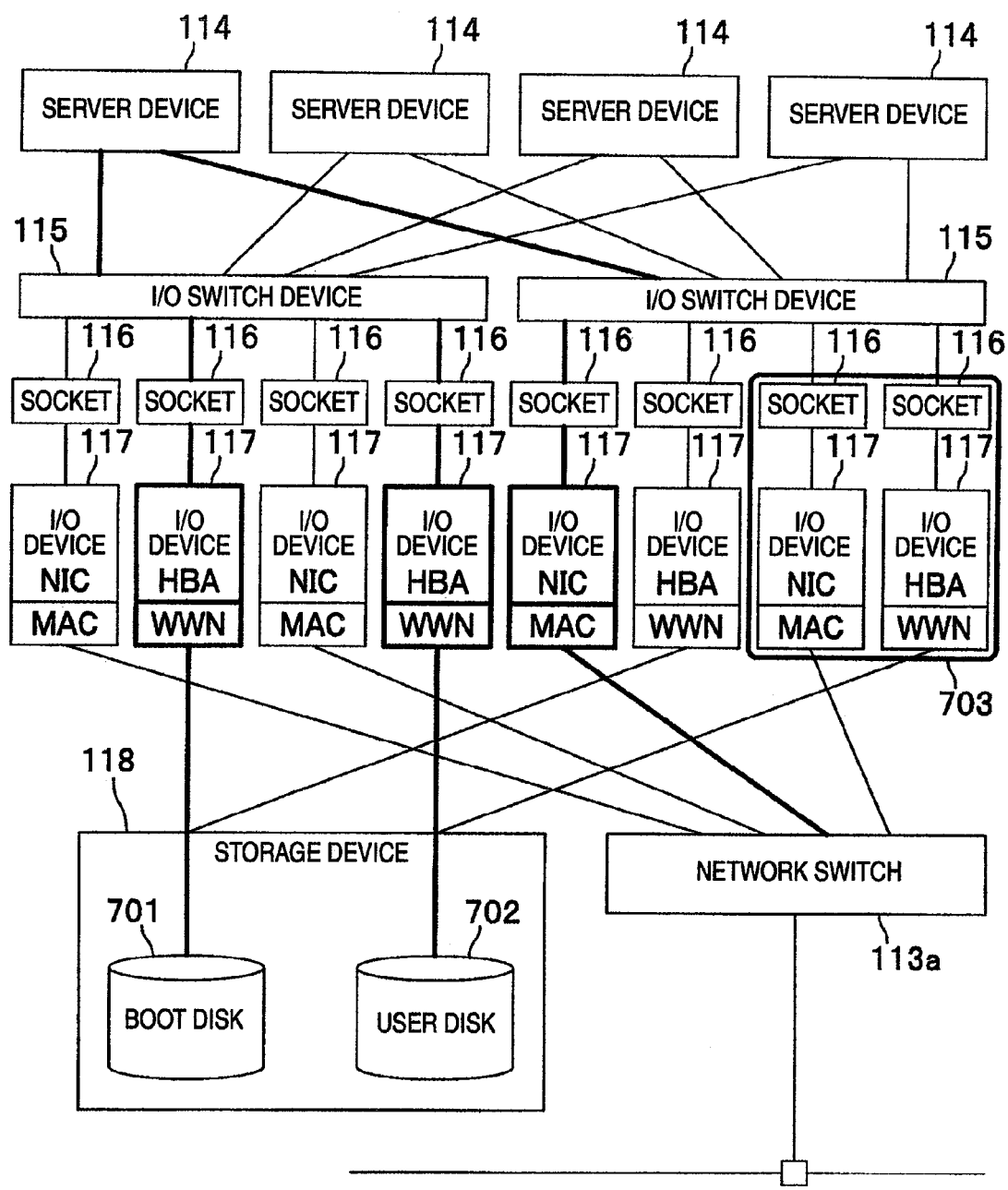
FIG. 7 is a partial diagram of the overall configuration for explaining an example of an operational outline associated with the present embodiment.

FIG. 7 is a partial diagram showing the overall configuration for explaining an example of an operational outline in the present embodiment. Further, in FIG. 7 to FIG. 9, the communication path, in the case where the left-hand server device 114, of the plurality of server devices 114, is connected with storage device 118 and network switch 113a (separate from network switch 113), is indicated with a bold line.

In FIG. 7, in the case where the I/O device 117 allocated to a server device 114 is normal, server device 114 is activated (a subsequent mention is made regarding a user disk 702) by using the designated I/O device 117 and accessing a boot disk 701 (corresponding to disk 503 in FIG. 5) in storage device 118. The characteristic here is that there is provided a device pool 703 consolidating not yet used I/O devices 117 for standby and managing the same. In device pool 703, a plurality of types of I/O devices 117 are pooled and provided for I/O configuration modifications. I/O switch device 115 can connect a plurality of types of I/O devices 117 via socket 116, at the discretion of the user.

As I/O devices 117, there are e.g. a NIC (Network Interface Card), an HBA (Host Bus Adapter) for connecting with storage device 118, and the like. Also, I/O switch device 115 supplies a path with which it is possible to transfer each and every piece of data.

It is I/O device 117 that has a function in I/O. As for I/O devices 117, it is not the case, unlike server devices 114, that the same have uniform functions. Consequently, in case an I/O device 117 has become abnormal, there is a need to pool a plurality of types of I/O devices 117 in advance in order to make it possible to make a recovery even if an abnormal configuration has been generated in whichever type of I/O device. Also, beyond the object of the present embodiment, I/O device pool 703 can also be used at the time of exchanging I/O devices 117 during a malfunction of an I/O device 117.

Figure 8:
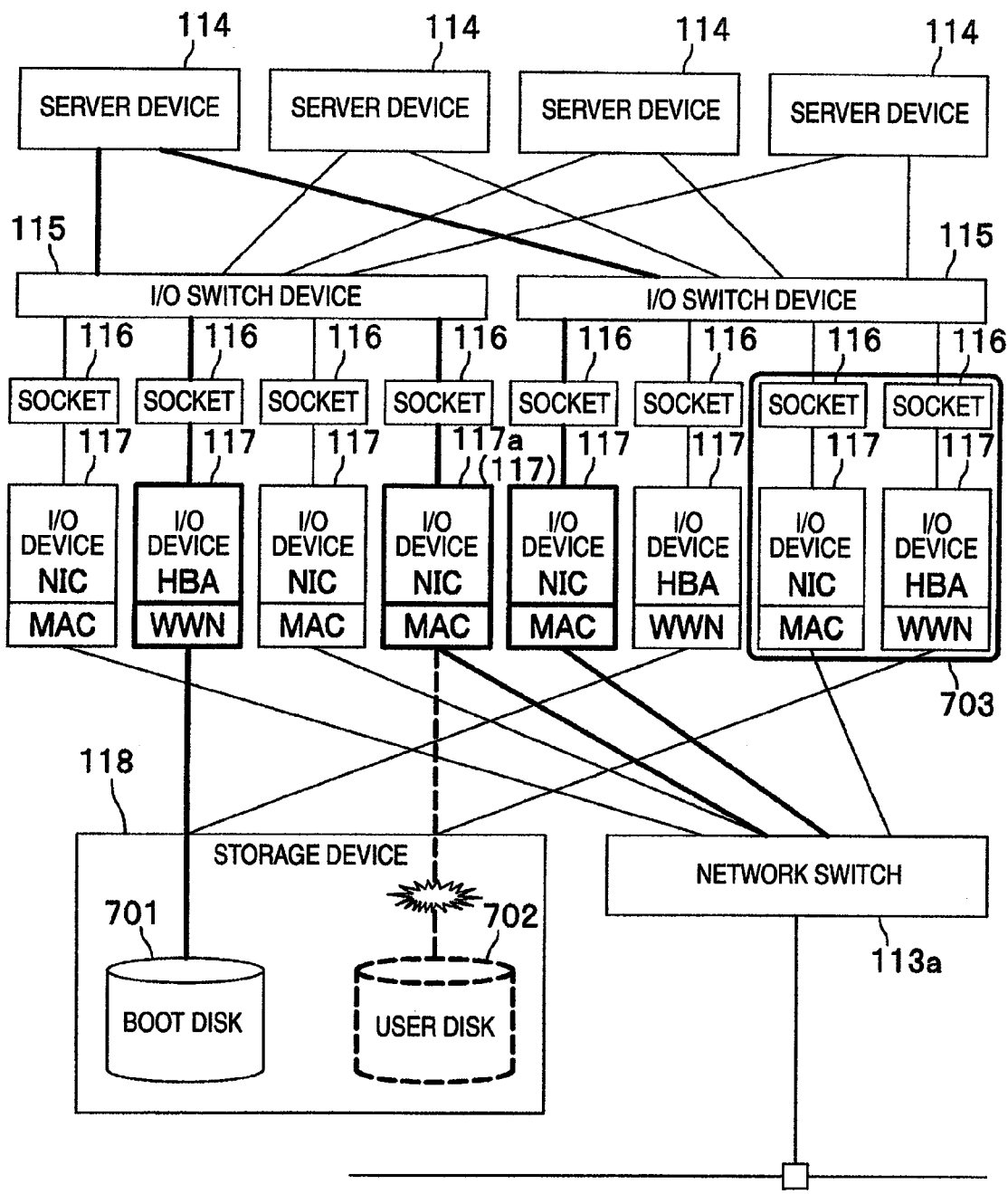
FIG. 8 is a diagram showing a state in which an I/O device is abnormal, corresponding to FIG. 7.

FIG. 8 is a partial diagram of the overall configuration for explaining an example corresponding to FIG. 7 of an operating outline for the present embodiment. In FIG. 8, in case an I/O device 117 allocated to server device 114 is normal, there is indicated a state in which server device 114 cannot make access to user disk 702. In other words, since I/O device 117a (117) is a NIC, server device 114 cannot make access to user disk 702 (I/O device 117a which is a NIC should be connected with network switch 113a).

At this point, the activation of server device 114 is temporarily halted and it is notified that the I/O device 117 designated by the user is in an abnormal state. In other words, it is notified that the current I/O configuration is in the state of FIG. 8. Since the user can learn, by means of this operation, that the current configuration is abnormal, this notification has very great significance.

As a result hereof, in an abnormal state in which access cannot be made to user disk 702, it becomes possible to hold back activating server device 114. The user can select whether to halt the activation of server device 114 or to repair the abnormal I/O device 117. Since the choice of reparation depends on the degree of importance of the I/O device 117 in server device 114, a function of allowing for flexible selection by the user is an important one.

Figure 9:
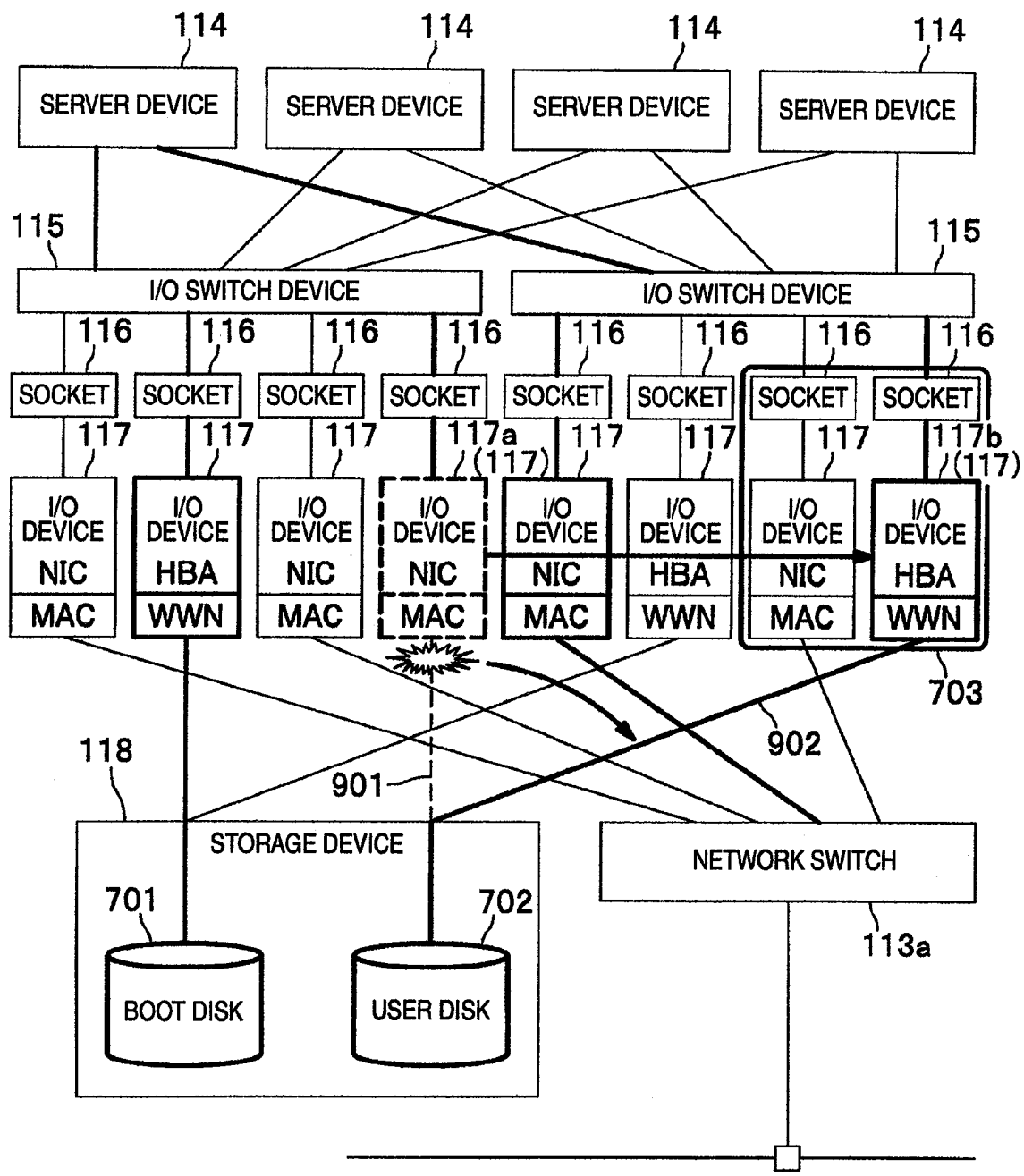
FIG. 9 is a diagram showing a method of recovery from a state in which an I/O device is abnormal, corresponding to FIG. 8.

FIG. 9 is a partial diagram of an overall configuration for explaining an example corresponding to FIG. 8 of the operational outline associated with the present embodiment. Server device 114 is activated with an I/O configuration in which the abnormal I/O device 117a shown in FIG. 8 has been replaced with a substitutable I/O device 117b. In other words, it becomes possible to change the path to user disk 702 from a path 901 passing through I/O device 117a to a substitute path 902 passing through I/O device 117b. In this way, the abnormal I/O configuration is repaired and it becomes possible for server device 114 to access user disk 702 which was so far not able to be accessed.

FIG. 10 is a diagram showing an example of an I/O switch management table 109. Column 1001 holds I/O switch identifiers, an identifier being allocated for each I/O switch device 115. Column 1002 indicates the port numbers (the identifiers of ports 407 in FIG. 4) of I/O switch device 115. In column 1003, there is stored information indicating the types of devices connected with the same ports (the "host" being server device 114). In column 1004, there is stored a device identifier constituting individual information, for each device. E.g., if what is concerned is a NIC, it is a MAC (Media Access Control) address, and if what is concerned is an HBA, it is a WWN (World Wide Name) or the like. As for column 1005, there are stored states of I/O devices 117. They are pieces of information such as "normal" (normal operation possible) and "error" (error occurrence).

The information of I/O switch management table 109 is updated at the time an I/O device 117 is newly connected, in case it has been exchanged due to an I/O device 117 error, or the like, or in case there has been a change in an I/O device 117. By having an I/O switch management table 109, it is possible to manage the states of the I/O devices 117 connected with I/O switch device 115. Also, by means of I/O switch management table 109, even in the case where an error occurs in an I/O device 117 and access to the I/O device 117 has become impossible, it becomes possible to obtain the identifier of the I/O device 117.

FIG. 11 is a diagram showing an example of a server management table 110. Column 1101 holds server device identifiers, an identifier being allocated for each server device 114. Regarding each server device 114, the processor configuration is stored in column 1102 and the memory capacity in column 1103. In column 1104, there are stored the port numbers of I/O switch devices 115 with which the concerned server devices 114 are connected.

In column 1105, there are stored the numbers of the ports with which the I/O devices 117 allocated by the concerned server devices 114 are connected. In column 1106, the types of I/O devices 117 allocated by server devices 114 are stored. In column 1107, there are stored logical unit numbers of the disks allocated by the concerned server devices 114. By means of server management table 110, it becomes possible to manage I/O devices 117 allocated to a server device 114.

FIG. 12 is a diagram showing an example of a server I/O configuration information table 111. In column 1201, I/O configuration definition (I/O configuration pattern) numbers are stored. In column 1202, I/O switch device 115 identifiers are stored. In column 1203, the port numbers of the same I/O switch devices 115 are stored.

In column 1204, there are stored the types of connecting devices (connecting I/O devices). In column 1205, the connection destination devices are stored ("SAN" being an abbreviation of "Storage Area Network" and corresponding to storage device 118 and "G/W" being an abbreviation of "Gateway" and corresponding to network switch 113). In column 1206, there are stored the names of allocated logical partitions ("LPAR" being an abbreviation of "Logical Partitioning").

Here, an explanation will be given regarding the logical partitions. As an example of a method of efficiently putting to practical use a well-performing server device 114 (i.e. one with high-speed processing, large storage capacity, and so forth), there is the previously mentioned LPAR. LPAR means logically dividing one server device 114 into a plurality of partitions (logical partitions) and allocating the CPU (Central Processing Unit), memory, and the like for each partition. Since it is possible to construct a plurality of systems on one server device 114, server device 114 can be efficiently put to practical use.

In the present embodiment, by carrying out management for each of these logical units rather than for each server device 114, management with fine granularity becomes simple. In particular, it is effective in the case of constructing multiple logical partitions using a virtualization function with respect to server device 114. Further, it is of course possible to manage for each server device 114.

Returning to FIG. 12 to continue the explanation, in column 1207, the activation operating system (OS) name is stored. By managing the activation OS, flexible handling becomes possible even in the case where OS-dependent operation becomes necessary on the occasion of an activation or a halt. In column 1208, there are stored logical location codes of I/O devices 117 managed by the activation OS. By here managing the logical location code managed by the original OS, it becomes possible to notify the OS of the fact that the I/O configuration has been repaired or to not positively make it aware of the change in I/O configuration. Further, this logical location code is e.g. expressed as a combination of identifiers of a PCI (Peripheral Component Interconnect) adapter and port, an SCSI (Small Computer System Interface) disk and LU (Logical Unit), or the like.

In column 1209, there are stored the degrees of importance of the connecting devices. By having the user register the degree of importance, it becomes possible to select whether or not to halt the activation in case it is judged, when activating server device 114, that the concerned device is abnormal. Here, the degree of importance is, as shown in domain 1210, something that expresses the levels of abnormal configuration and is set for each I/O device 117 in four stages from Level 0 to Level 3.

In this way, in case an I/O device or a connection destination device is modified abnormally, it becomes possible, by managing server I/O configuration information table 111, to easily detect the same. Since it is possible to manage a plurality of I/O configurations with respect to another server device 114, it becomes simple to modify the I/O configuration depending on the use.

FIG. 13 is a diagram showing an example of a device pool management table 112. In column 1301, there are stored the identifiers of I/O switch devices 115. In column 1302, there are stored the port numbers of the same I/O switch devices 115. In column 1303, there are stored the allocation states of I/O devices 117. They are e.g. pieces of information such as "allocation completed" or "not yet allocated" to server device 114.

In column 1304, there are stored the device pool allocation states. In FIG. 13, there is shown an example in which each port 6, 7 of SW1 and SW2 are allocated as a device pool. In the device pool, when an abnormality or error has occurred in an I/O device 117, it is possible to define a substitute I/O device 117. Consequently, the administrator can make allocations in response to the type, priority, et cetera, of the I/O device 117 desired to be replaced.

Further, the I/O devices 117 allocated to the device pool need not have consecutive port numbers, it being acceptable to allocate non-consecutive port numbers. Also, a plurality of device pools may be provided to one I/O switch device 115. If the number of I/O devices becomes large, the reliability of the overall system is improved by also increasing the number of I/O devices 117 defined as the device pool. Further, it is acceptable not to define all the not yet allocated I/O devices 117 in the device pool. In other words, it is also possible for the administrator, to make preparations for uses such as allocating manually, to provide not yet allocated I/O devices 117 that are not attached to the device pool.

FIG. 14 is a diagram showing an example of a port management table 406. In column 1401, there are stored physical port numbers (physical identifiers of ports 407) of its own I/O switch device 115. In column 1402, allocation groups are stored. The allocation groups indicate port links. E.g., between ports having the same allocation group, data transfers are possible, but between ports having different allocation groups, data transfers are not possible.

In column 1403, logical port numbers are stored. The logical port numbers are mechanisms for virtualizing port numbers with respect to server devices 114. E.g., since the port having the physical port number "4" (in column 1401) has "2" allocated as a logical port, it is possible to make it look like port number "2" in server devices 114.

By virtualizing the ports, it becomes possible to flexibly allocate a hardware configuration with respect to server devices 114. E.g., in the case where an error has occurred in an I/O device 117 and it has been replaced with another I/O device 117, it is possible to show the configuration in the same way by using port virtualization. Also, even if what is concerned is a server device 114 to which similar I/O devices 117 have been allocated, there are cases where the recognition order of the devices of the operating system differs, due to the fact that the order of the port numbers of I/O switch device 115 with which I/O devices 117 are connected changes, so in this way, it sometimes occurs the defect that the recognition order of disk 503 is modified. In this kind of case, it becomes possible to avoid the defect by using the logical port number and modifying the order.

Figure 15:
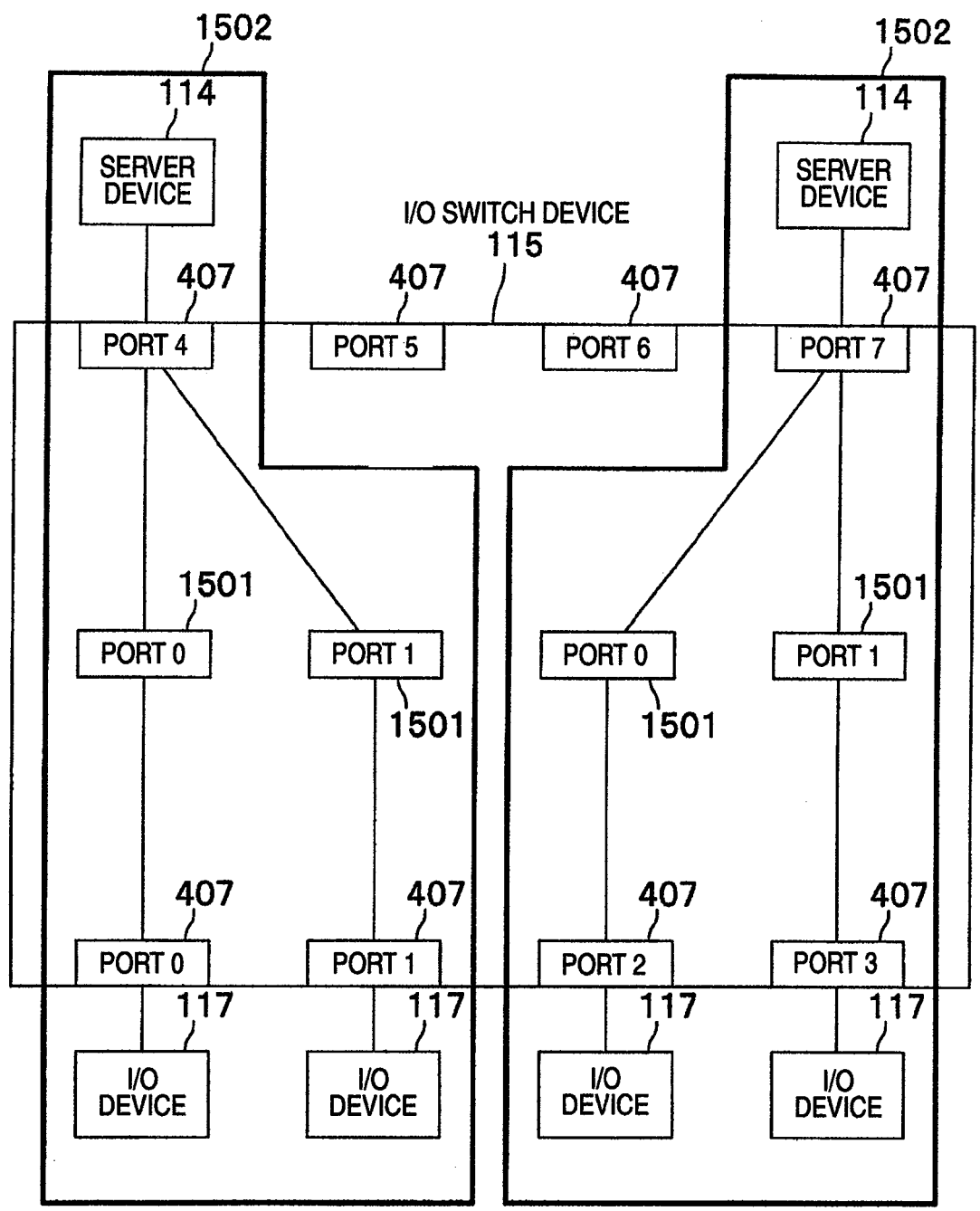
FIG. 15 is a diagram showing an I/O device allocation example.

FIG. 15 is a diagram showing an allocation example of an I/O switch device 115. With respect to a server device 114, it is possible to allocate an arbitrary I/O device 117, using the function of the aforementioned allocation group 1502. Also, it is possible to virtualize physical port 407 with which I/O device 117 is connected and show it as logical port 1501 to server device 114. In FIG. 15, "0", "1", "2", and "3" of physical port 407 correspond, respectively, to the logical ports "0", "1", "0", and "1". Since, due to allocation group 1502, it is not possible to access I/O device 117 from another allocation group 1502, reliability can be improved.

Figure 16:
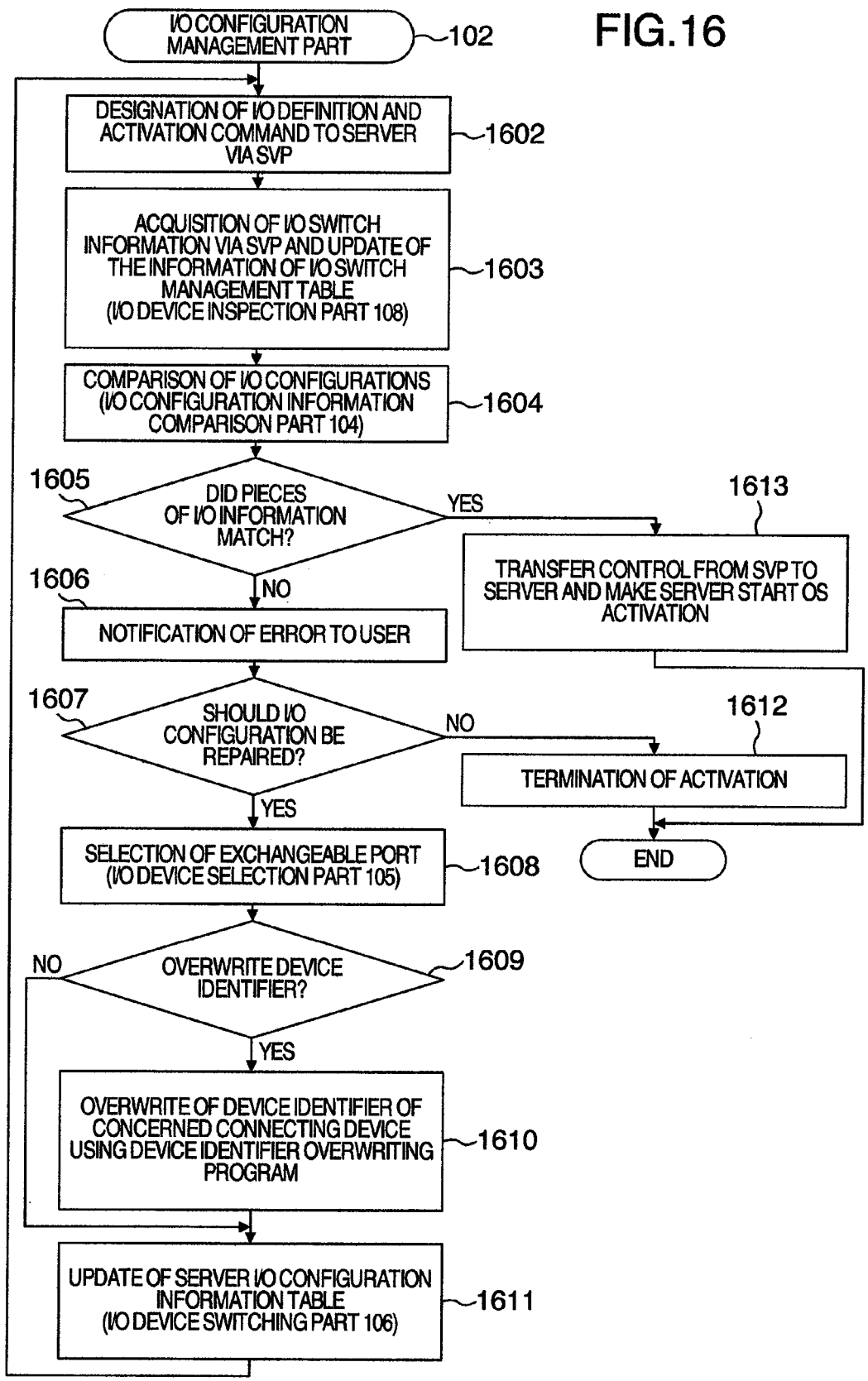
FIG. 16 is a diagram showing the flowchart of an I/O configuration management part.

FIG. 16 is a diagram showing the process flow of I/O configuration management part 102 controlling server device 114. Further, each part constituting I/O configuration management part 102 is actually executed by means of processor 202, but for the sake of convenience, each part is hereinafter described as an object executing the operation.

First, in Step 1602, server control part 103 designates an I/O definition stored in server I/O configuration information table 111 and carries out an activation command for server device 114 via SVP 119. Next, in Step 1603, I/O device inspection part 108 communicates with I/O switch device 115 via SVP 119, obtains information (I/O switch information) about I/O switch device 115, and updates the information of I/O switch management table 109.

And then, in Step 1604, I/O configuration information comparison part 104 compares the updated most recent I/O switch management table 109 with server I/O configuration information table 111. In Step 1605, I/O configuration information comparison part 104 judges whether the pieces of I/O information match and, in case the pieces of I/O information match ("Yes" in Step 1605), the process proceeds to Step 1613 and, in case the pieces of I/O information do not match ("No" in Step 1605), it proceeds to Step 1606.

In Step 1613, server control part 103 transfers control from SVP 119 to server device 114 and, using I/O device allocation part 107, starts activation from the OS with respect to server device 114, using the designated I/O device 117. The OS is stored in a device such as storage device 118 that is farther inside than I/O device 117, seen from server device 114.

In Step 1606, server control part 103 notifies the user of the effect of an error and the content thereof. After Step 1606, server control part 103 judges whether the user has selected (entered) whether or not to repair the I/O configuration (Step 1607). Server control part 103, in case it has judged that the user had selected not to repair the I/O configuration ("No" in Step 1607), halts the activation of server device 114 in Step 1612 and terminates the processing. In case it has judged that the user had selected to repair the I/O configuration ("Yes" in Step 1607), server control part 103 proceeds to processing supposed to correct the I/O configuration in Step 1608 and subsequent steps.

In Step 1608, I/O device selection part 105 selects, with reference to device pool management table 112, an exchangeable port (slot) of I/O switch device 115. After Step 1608, server control part 103 judges whether the user has selected (entered) whether or not to overwrite a device identifier (Step 1609).

Server control part 103, in case the user has selected to overwrite a device identifier ("Yes" in Step 1609), overwrites device identifier 1004 of the concerned connecting device in I/O switch management table 109 in Step 1610, using device identifier overwriting program 120. In case the user has selected not to overwrite a device identifier ("No" in Step 1609), server control part 103 skips Step 1610 and proceeds to Step 1611.

In Step 1611, I/O device switching part 106 updates server I/O configuration information table 111. After this, the process returns to Step 1602, repeats the processing, and activates the OS of server device 114. In this way, it is guaranteed, by activating server device 114 only with the I/O configuration defined by the user, that the I/O device 117 connected with server device 114 is correct.

Figure 17:
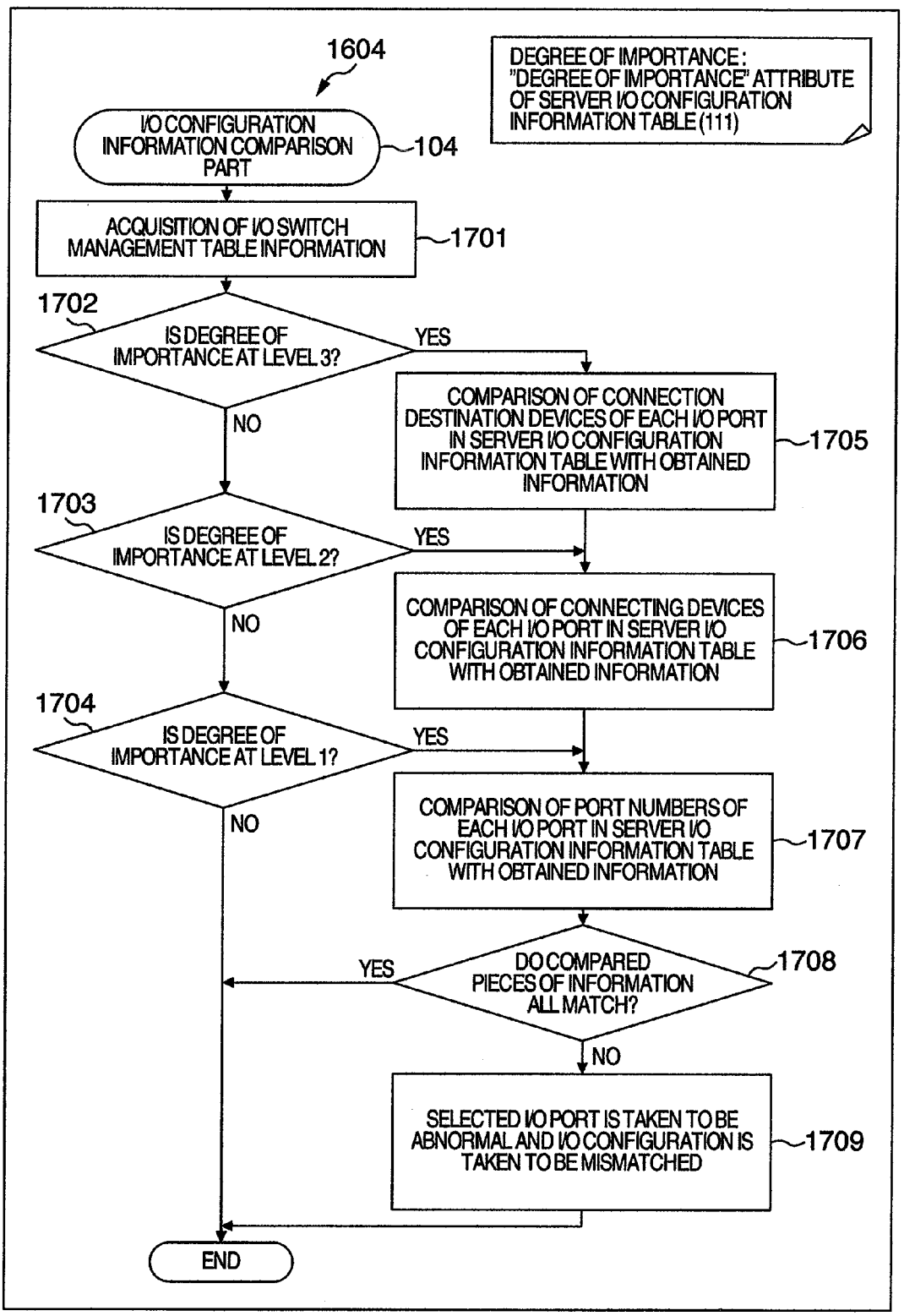
FIG. 17 is a diagram showing the flowchart of an I/O configuration information comparison part.

FIG. 17 is a diagram showing the process flow (detail of Step 1604) of I/O configuration information comparison part 104. I/O configuration information comparison part 104, in Step 1701, obtains the information of the updated (most recent) I/O switch management table 109. As for subsequent processing, the processing branches off by the levels stored in the Degree of Importance column (ref. 1209) of server I/O configuration information table 111.

In the case where the degree of importance is at Level 3 ("Yes" in Step 1702), the pieces of information about I/O switch device 115 obtained in Step 1603 and the pieces of information about the connection destination device (ref. 1205) in server I/O configuration information table 111 are compared (Step 1705) and the process proceeds to Step 1706.

In the case where the degree of importance is at Level 2 ("Yes" in Step 1703), the obtained pieces of information about connecting devices of I/O switch device 115 (connecting devices 1003 of I/O switch management table 109) and the pieces of information about the connecting devices (ref. 1204) in server I/O configuration information table 111 are compared (Step 1706) and the process proceeds to Step 1707.

In the case where the degree of importance is at Level 1 ("Yes" in Step 1704), the obtained pieces of information about port numbers of I/O switch device 115 (port numbers 1002 of I/O switch management table 109) and the pieces of information about I/O port numbers (ref. 1203) in server I/O configuration information table 111 are compared (Step 1707).

It is checked (Step 1708) whether or not the compared pieces of information all match and, in case they all match (Yes), the result is that the present processing comes to an end without doing anything, but in case they do not all match (No), the selected I/O port is taken to be an abnormal I/O port and processing is terminated taking the I/O configuration to be mismatched (Step 1709).

In other words, as shown in field 1210 of FIG. 12, in case the degree of importance is at Level 3, there is judged to an abnormality if port numbers, connecting devices, and connection destination devices are all mismatched, in the case of Level 2, there is judged to be an abnormality if port numbers and connecting devices are mismatched, and in the case of Level 1, there is judged to be an abnormality if the port numbers are mismatched, and there is judged not to be any abnormality in the case of Level 0.

In this way, it is possible, by changing the level of matching of the I/O configuration depending on the degree of importance, to flexibly operate computer system S. E.g., by increasing the degree of importance (ref. 1209) of important I/O devices 117, it is possible to avoid problems such as the impossibility of activation due to an abnormal configuration of I/O devices 117 which are mandatory for a server device 114. Also, by decreasing the degree of importance (ref. 1209) of I/O devices 117 which are not important, it is possible to avoid that server device 114 ends up not being activated at all due to deficiencies of I/O devices 117 with little influence with respect to server device 114. Further, regarding I/O devices 117 not set in Level 0, the pieces of I/O configuration information are not compared.

Figure 18:
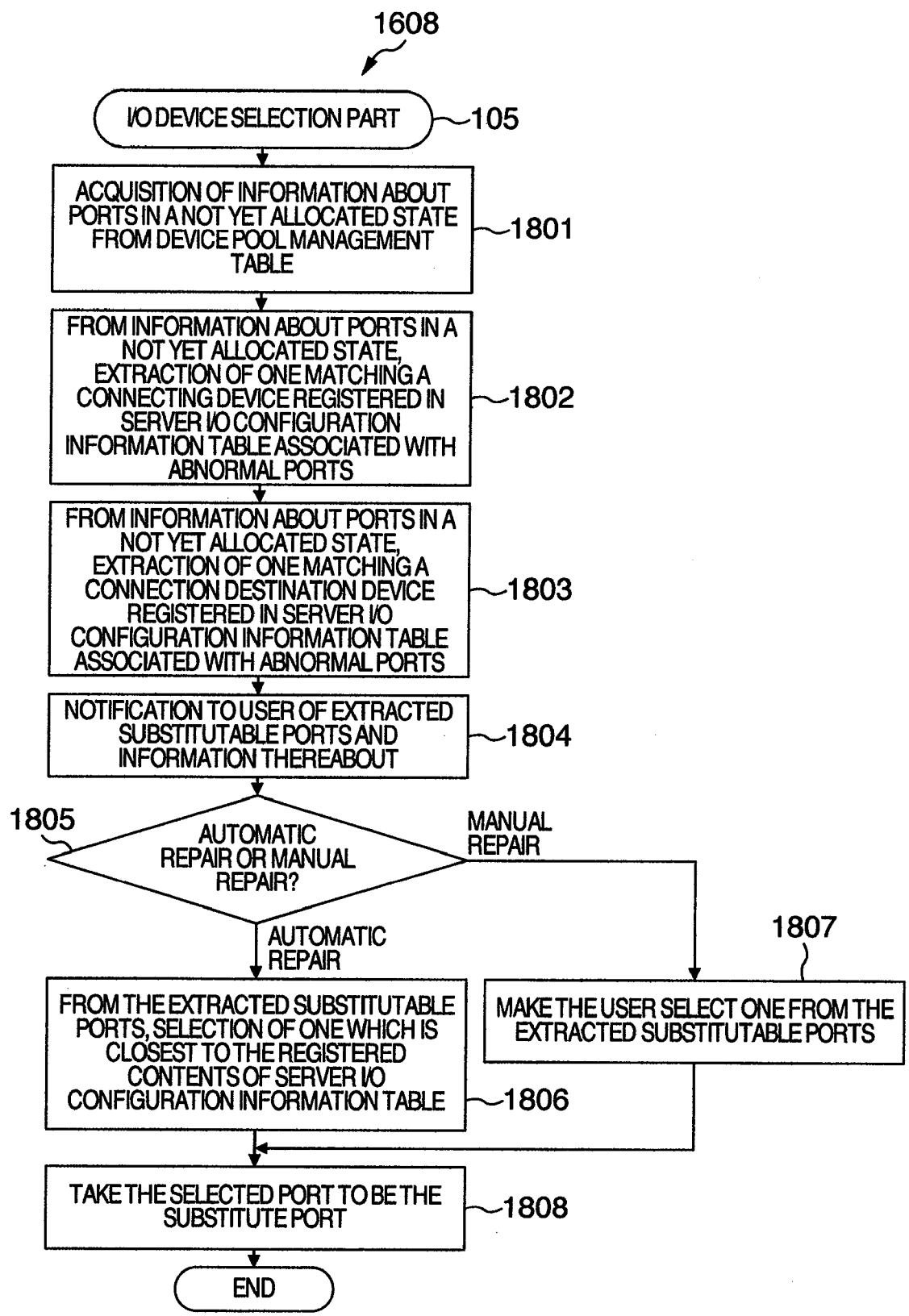
FIG. 18 is a diagram showing the flowchart of an I/O device selection part.

FIG. 18 is a diagram showing the process flow (detail of Step 1608) of I/O device selection part 105 selecting a substitute I/O port from the exchangeable I/O ports. I/O device selection part 105 obtains, in Step 1801, information about ports in a not yet allocated state from device pool management table 112. Next, in Step 1802, from the information about ports in a not yet allocated state, it extracts one matching a connecting device (ref. 1204) registered in server I/O configuration information table 111 associated with abnormal ports. In Step 1803, from the information about ports in a not yet allocated state, it extracts one matching a connection destination device (ref. 1205) registered in server I/O configuration information table 111 associated with abnormal ports.

In Step 1804, the extracted substitutable ports and the information thereabout are notified to the user. At this point, by having the user select either a manual or an automatic repair method, the processing is branched off (Step 1805). I/O device selection part 105, in case it is judged that the user has selected an automatic repair method ("Automatic repair" in Step 1805), selects, from the extracted substitutable ports, the one which is closest to the registered contents of server I/O configuration information table 111 (Step 1806). I/O device selection part 105, in case it is judged that the user has selected a manual repair method ("Manual repair" in Step 1805), makes the user select (Step 1807) one port from the extracted substitutable ports. After Step 1806 and Step 1807, the extracted port is taken to be a substitute port (Step 1808) and processing comes to an end.

Figure 19:
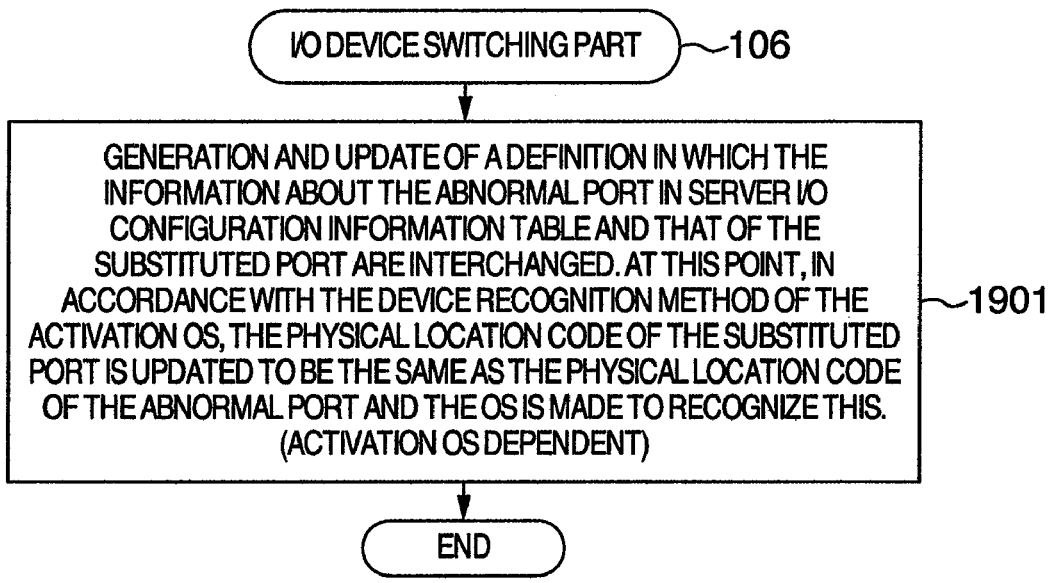
FIG. 19 is a diagram showing the flowchart of an I/O device switching part.

FIG. 19 is a diagram showing the process flow (detail of Step 1611) of an I/O device switching part 106 updating server I/O configuration information table 111. In Step 1901, I/O device switching part 106 generates and updates a definition in which the information about the abnormal port in server I/O configuration information table 111 and that of the substituted port are interchanged. At this point, in accordance with the device recognition method of the activation OS, it updates the physical location code of the substituted port to be the same as the physical location code of the abnormal port and makes the OS recognize this.

As a result hereof, it is possible for the OS to be activated to avoid a situation where it cannot recognize the substituted I/O device 117 due to the fact that I/O device 117 has been changed, making it possible to expect the same operation as before the I/O configuration had been changed, without any setting on the OS side. Further, since, in server I/O configuration information table 111, activation OS are stored in column 1207 and logical location codes are stored in column 1208, the processing contents of Step 1901 may be changed by means of the I/O device recognition method associated with each activation OS. E.g., if what is concerned is an OS in which there is no need to modify the physical location, an update of the physical location is not implemented. Alternatively, in case there is a need to modify the logical location code, processing such as updating the logical location code and handing over the information to the OS can be considered.

Figure 20:
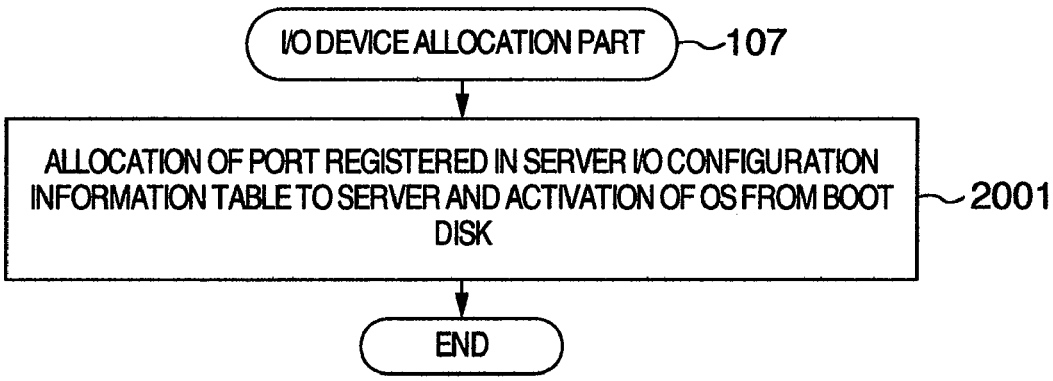
FIG. 20 is a diagram showing the flowchart of an I/O device allocation part.

FIG. 20 is a diagram showing the process flow (a part of the processing of Step 1613) of I/O device allocation part 107 allocating I/O devices to server device 114. I/O device allocation part 107, in Step 2001, allocates a port registered in server I/O configuration information table 111 to server device 114 and, with respect to server device 114, activates the OS from boot disk 701. Starting with this processing, control is handed over to the OS. Here, since the I/O configuration is normally in a correct state, it is possible to hold back an impossibility of activating an OS associated with an abnormal I/O configuration or a configuration fault such as the network not being able to communicate.

Figure 21:
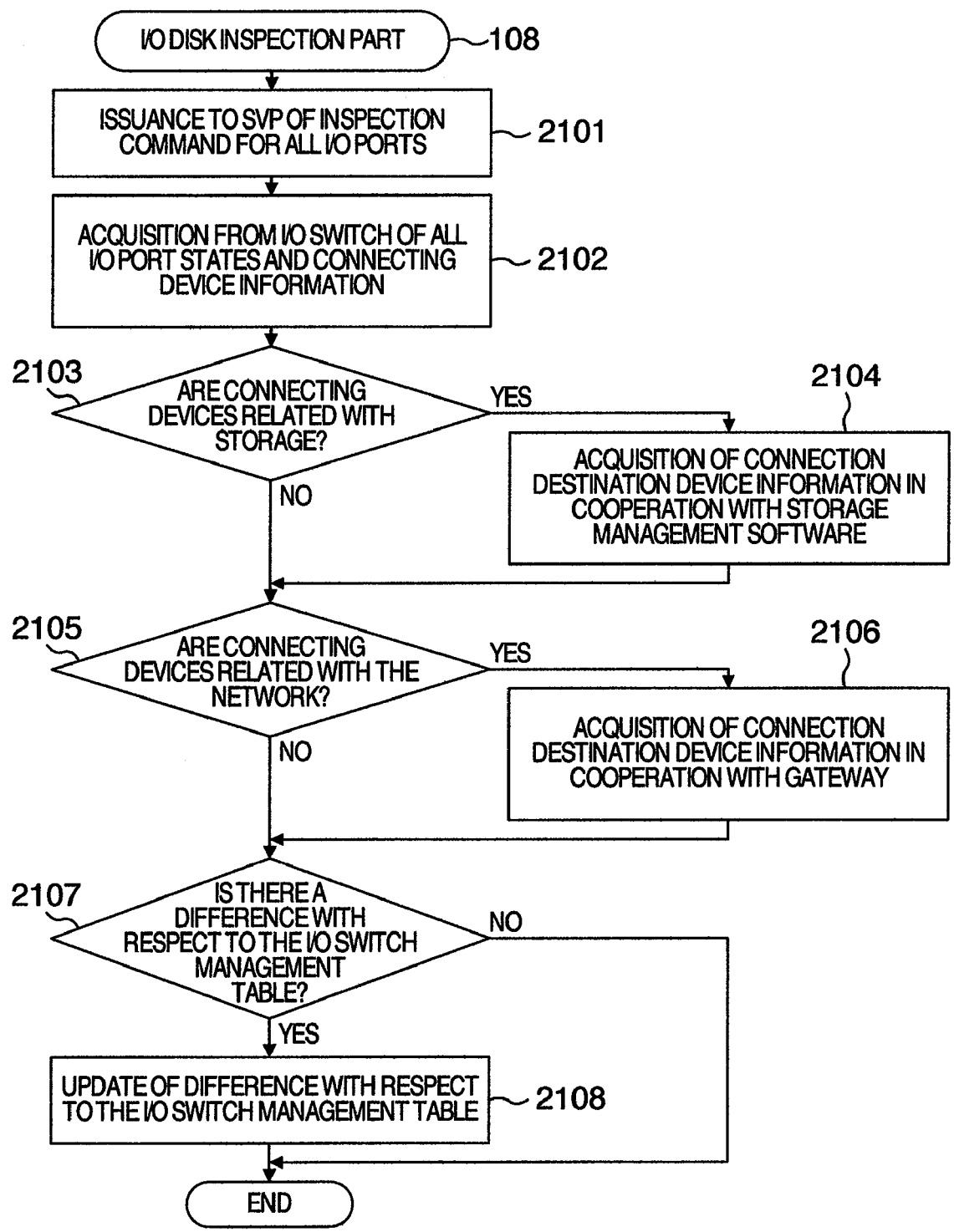
FIG. 21 is a diagram showing the flowchart of an I/O device inspection part.

FIG. 21 shows a process flow (detail of Step 1603) of I/O device inspection part 108 obtaining information about I/O ports connected with I/O switch device 115 and updating the information of I/O switch management table 109. In Step 2101, I/O device inspection part 108 issues an inspection command to SVP 119 for all I/O ports connected with I/O switch device 115.

Next, in Step 2102, there are obtained via SVP 119 the states of all I/O ports connected with I/O switch device 115 as well as connecting device information. Here, in case a connecting device has a relation with a storage device 118 such as an HBA ("Yes" in Step 2103), information about the connection destination device is obtained in cooperation with (not illustrated) storage management software (Step 2104). Also, in case a connecting device has a relation with a network ("Yes" in Step 2105), information about the connection destination device is obtained in cooperation with a gateway or the like (Step 2106).

Here, as for the obtained information about I/O switch device 115, it is judged whether there is a difference with respect to I/O switch management table 109 (Step 2107) and, in case there is a difference (Yes), the difference with respect to I/O switch management table 109 is updated (Step 2108) and in case there is no difference (No), the processing is ended.

In this way, by having cooperative functions with connection destination devices, it becomes possible to manage even an abnormality of the I/O or a network configuration of a whole system with which a server device 114 under management is related. Further, in Step 2106, there may be installed security countermeasure functions associated with the network. E.g., by holding back a state in which a network segment or host which originally must not be connected gets connected, abnormal access to server device 114 is held back. Alternatively, if malicious connections from the outside such as viruses and DOS (Denial of Service) attacks are blocked here, it is possible to expect a greater improvement in security.

FIG. 22 is a diagram showing an example of a GUI (Graphical User Interface), defining the I/O configuration of a server device, which is displayed in display part 205 of management server 101. In management server 101, it is possible for the user to manage one or a plurality of I/O definitions (here I/O profiles) for each server device 114 (here CPU Blade servers). In the example of FIG. 22, there is shown an edit screen 2201 for the I/O configuration definition of a certain server device, the screen defining and managing an I/O configuration called DB Server. In the case of using it as a DB Server as in this example, it is possible, by defining a large number of HBAs and setting the degree of importance of the connection destination SAN disk to be high, to manage, to the best of one's ability, so that a state in which it is not possible to access the data does not occur.

Also, even if what is concerned is an I/O configuration with respect to the same server device 114, it becomes possible, by e.g. generating an I/O configuration definition like a Web server and setting a large number of NICs, to define a configuration capable of guaranteeing a network band and activate with the same configuration in case of need. As a result hereof, it is possible, at the time of activating server device 114, to easily activate server device 114 with the desired I/O configuration by designating an I/O configuration definition edited in response to the use.

FIG. 23 is a diagram showing an example of an activation error notification screen associated with Step 1606 of FIG. 16, the screen being displayed on display part 205 of management server 101. During processing of Step 1606 of FIG. 16, this activation error notification screen 2301 is notified to the user. As a result hereof, it is possible to notify that a device which actually differs from that of the I/O configuration defined by the user is connected with I/O switch device 115 and to make the user select the processing thereafter. Further, in order to handle a case where, in an emergency, it is desired to activate even with an abnormal configuration, there may, other than "Halt the activation and revise the I/O configuration" and "Implement a repair", be added an item "Disregard and continue the activation".

FIG. 24 is a diagram showing an example of an I/O repair screen occurring in Step 1807 of FIG. 18, the screen being displayed in display part 205 of management server 101. As shown in I/O repair screen 2401, it becomes possible to update the I/O configuration definition by having the user check abnormal I/O ports and substitutable ports one by one in checkboxes.

In this way, according to a computer system S of the present embodiment, it is possible to simplify the management of computers (server devices 114) connected with I/O switch devices 115. In other words, adapting to the mode of utilization of the administrator, it is possible to simplify the management of server devices 114 without losing the function of flexibly allocating I/O devices 117 to server devices 114 by managing the I/O configuration to implement the holding back/repair of an abnormal I/O configuration modification.

That being all, the explanation of the embodiments is brought to an end, but the modes of the present invention are not limited hereto. E.g., the present invention can be applied regardless of the use, or not, of a technology of virtualization of server device 114.

Additionally, regarding the specific configuration of hardware, programs, and the like, suitable modifications not departing from the spirit of the present invention are possible.

The invention claimed is:

1. A computer system comprising one or several computers, one or several I/O devices allocated for each of said computers and for connecting with external devices, one or several I/O switch devices interposed between said computers and said I/O devices and switching the connections thereof, and a management server managing the situation of the connections between said computers and said I/O devices, wherein:

said management server is provided with a storage part storing I/O configuration information, defining the association between said computers and said I/O devices, and I/O switch management information managing information about said connected I/O devices for each of said I/O switches; and a processing part comparing pieces of said I/O configuration information and pieces of said I/O switch management information, judging whether there might be a mismatch in the connection configuration between said computers and said I/O devices and, in case it is judged that there is a mismatch, terminating the activation for the computer having the mismatched connection configuration, allocating a substitute I/O device, and updating said I/O switch management information.

2. The computer system according to claim 1, wherein said I/O configuration information has a plurality of combination patterns with said computers and one or several I/O devices connected with the same computers;

said I/O switch management information has at least connection port numbers of said I/O switch devices, connecting I/O device names indicating the types of I/O devices to be connected, and identifiers of the I/O devices to be connected; and said processing part, in case it is judged that there is a mismatch in the configuration of the connection between said computer and said I/O device, designates said I/O device having the mismatched connection configuration from said I/O configuration information, and overwrites the identifier of said designated I/O device in said I/O switch management information with the identifier of said substitute I/O device.

3. The computer system according to claim 2, wherein said processing part receives a mismatched connection configuration occurrence notification from the I/O device for which said mismatched connection configuration has occurred and carries out an overwrite of the identifier of said I/O device.

4. The computer system according to claim 1, wherein said I/O switch device has a function of converting the number of the port with which said I/O device is connected into an arbitrary port number at the instruction of said computer and, at the time of the mismatched connection configuration occurrence of said I/O device, converts the number of the port with which said substitute I/O device is connected into the number of the port with which the I/O device for which said mismatched connection configuration has occurred is connected.

5. The computer system according to claim 1, wherein said computer system is provided with said I/O devices for standby use with respect to said I/O switch device and said processing part, at the time of the mismatched connection configuration occurrence of said I/O device, selects and allocates, in accordance with a criterion which is pre-registered by the administrator in said I/O configuration information, said substitute I/O device from said I/O devices for standby use with respect to said I/O switch device.

6. The computer system according to claim 5 wherein there is provided a plurality of types of said I/O devices for standby use.

7. The computer system according to claim 1, wherein said management server is further provided with a display part and said processing part,
in case it has been judged that there is a mismatch in the configuration of the connection between said computer and said I/O device, makes a notification screen for the same mismatched connection configuration and a screen for selecting any of an activation halt, a connection repair, and a forced activation, of said computer which has the mismatched connection configuration, be displayed to the administrator on said display part.

8. The computer system according to claim 1, wherein said processing part
updates said I/O switch management information at the time of activation of any of said computers and, by comparing said I/O configuration information and said updated I/O switch management information, judges a mismatch in the configuration of the connection between said computer and said I/O device.

9. A management server in a computer system comprising one or several computers, one or several I/O devices allocated for each of said computers and for connecting with external devices, one or several I/O switch devices interposed between said computers and said I/O devices and switching the connections thereof, and a management server managing the situation of the connections between said computers and said I/O devices;
the management server being provided with a storage part storing I/O configuration information, defining the association between said computers and said I/O devices, and I/O switch management information managing information about said connected I/O devices for each of said I/O switches; and
a processing part comparing pieces of said I/O configuration information and pieces of said I/O switch management information, judging whether there might be a mismatch in the connection configuration between said computers and said I/O devices and, in case it is judged that there is a mismatch, terminating the activation for the computer having the mismatched connection configuration, allocating a substitute I/O device, and updating said I/O switch management information.

10. The management server according to claim 9, wherein said I/O configuration information has a plurality of combination patterns with said computers and one or several I/O devices connected with the same computers;
said I/O switch management information has at least connection port numbers of said I/O switch devices, connecting I/O device names indicating the types of I/O devices to be connected, and identifiers of the I/O devices to be connected; and
said processing part,
in case it is judged that there is a mismatch in the configuration of the connection between said computer and said I/O device, designates said I/O device having the mismatched connection configuration from said I/O configuration information and overwrites the identifier of said designated I/O device in said I/O switch management information with the identifier of said substitute I/O device.

11. The management server according to claim 10, wherein said processing part
receives a mismatched connection configuration occurrence notification from the I/O device for which said mismatched connection configuration has occurred and carries out an overwrite of the identifier of said I/O device.

12. The management server according to claim 9, wherein said computer system is provided with said I/O devices for standby use with respect to said I/O switch device and
said processing part,
at the time of the mismatched connection configuration occurrence of said I/O device, selects and allocates, in accordance with a criterion which is pre-registered by the administrator in said I/O configuration information, said substitute I/O device from said I/O devices for standby use with respect to said I/O switch device.

13. The management server according to claim 12 wherein there is provided a plurality of types of said I/O devices for standby use.

14. The management server according to claim 9, further provided with a display part and wherein
said processing part,
in case it has been judged that there is a mismatch in the configuration of the connection between said computer and said I/O device, makes a notification screen for the same mismatched connection configuration and a selection screen for a selection including an activation halt, a connection repair, and a forced activation, of said computer which has the mismatched connection configuration, be displayed to the administrator on said display part.

15. A mismatched connection configuration detection method based on a management server in a computer system comprising one or several computers, one or several I/O devices allocated for each of said computers and for connecting with external devices, one or several I/O switch devices interposed between said computers and said I/O devices and switching the connections thereof, and a management server managing the situation of the connections between said computers and said I/O devices; wherein
said management server is provided with a storage part storing I/O configuration information, defining the association between said computers and said I/O devices, and I/O switch management information managing information about said connected I/O devices for each of said I/O switches, and a processing part; and
said processing part compares pieces of said I/O configuration information and pieces of said I/O switch management information, judges whether there might be a mismatch in the connection configuration between said computers and said I/O devices and, in case it is judged that there is a mismatch, terminates the activation for the computer having the mismatched connection configuration, allocates a substitute I/O device, and updates said I/O switch management information.

16. The mismatched connection configuration detection method according to claim 15, wherein said I/O configuration information has a plurality of combination patterns with said computers and one or several I/O devices connected with the same computers;
said I/O switch management information has at least connection port numbers of said I/O switch devices, connecting I/O device names indicating the types of I/O devices to be connected, and identifiers of the I/O devices to be connected; and
said processing part,
in case it is judged that there is a mismatch in the configuration of the connection between said computer and said I/O device, designates said I/O device having the mismatched connection configuration from said I/O configuration information and overwrites the identifier of said designated I/O device in said I/O switch management information with the identifier of said substitute I/O device.

17. The mismatched connection configuration detection method according to claim 16, wherein said processing part
receives a mismatched connection configuration occurrence notification from the I/O device for which said mismatched connection configuration has occurred and carries out an overwrite of the identifier of said I/O device.

18. The mismatched connection configuration detection method according to claim 15, wherein said computer system is provided with said I/O devices for standby use with respect to said I/O switch device and
said processing part,
at the time of the mismatched connection configuration occurrence of said I/O device, selects and allocates, in accordance with a criterion which is pre-registered by the administrator in said I/O configuration information, said substitute I/O device from said I/O devices for standby use with respect to said I/O switch device.

19. The mismatched connection configuration detection method according to claim 18 wherein there is provided a plurality of types of said I/O devices for standby use.

20. The mismatched connection configuration detection method according to claim 15, wherein said management server is further provided with a display part and
said processing part,
in case it has been judged that there is a mismatch in the configuration of the connection between said computer and said I/O device, makes a notification screen for the same mismatched connection configuration and a screen for selecting any of an activation halt, a connection repair, and a forced activation, of said computer which has the mismatched connection configuration, be displayed to the administrator on said display part.

* * * * *